United States Patent
Chan et al.

(10) Patent No.: US 7,136,936 B2
(45) Date of Patent: Nov. 14, 2006

(54) METHOD AND SYSTEM FOR VIRTUAL POWERLINE LOCAL AREA NETWORKS

(75) Inventors: Tat Keung Chan, South San Francisco, CA (US); Songly Mu, Salida, CA (US)

(73) Assignee: Asoka USA Corporation, Foster City, CA (US)

( * ) Notice: Subject to any disclaimer, the term of this patent is extended or adjusted under 35 U.S.C. 154(b) by 262 days.

(21) Appl. No.: 10/712,748

(22) Filed: Nov. 12, 2003

(65) Prior Publication Data

US 2005/0076148 A1 Apr. 7, 2005

Related U.S. Application Data

(60) Provisional application No. 60/508,482, filed on Oct. 3, 2003.

(51) Int. Cl.
  G06F 15/16 (2006.01)
  H04L 12/66 (2006.01)
(52) U.S. Cl. .................. 709/250; 370/463; 709/218
(58) Field of Classification Search ................. 709/250
  See application file for complete search history.

(56) References Cited

U.S. PATENT DOCUMENTS

| | | | | |
|---|---|---|---|---|
| 5,684,826 A | * | 11/1997 | Ratner | 375/222 |
| 5,812,557 A | * | 9/1998 | Stewart et al. | 714/712 |
| 6,018,690 A | * | 1/2000 | Saito et al. | 700/295 |
| 6,130,896 A | * | 10/2000 | Lueker et al. | 370/469 |
| 6,188,557 B1 | | 2/2001 | Chaudhry | |

(Continued)

FOREIGN PATENT DOCUMENTS

DE   100 08 602 A1   6/2001

(Continued)

OTHER PUBLICATIONS

Evans; "The CEBus Standard User's Guide, The Training Dept. Publications, May 1996."

Primary Examiner—John B Walsh
(74) Attorney, Agent, or Firm—Townsend and Townsend and Crew LLP

(57) ABSTRACT

A system for powerline networking. The system has an external data source, which is derived from a world wide networks of computers. A router is coupled to the external data source and coupled to a first datasource connection. A powerline network switch apparatus is coupled to the first datasource connection. The apparatus has a second datasource connection, which is coupled to the first data source connection. The apparatus also has a powerline device coupled to the second datasource connection. Preferably, the powerline device is adapted to receive and transmit information in a first format from the second data source connection and adapted to receive and transmit information in a second format. The apparatus also has a virtual local area network device including a first input/output port and a plurality of second input/output ports. Each of the second input/output ports is numbered from 1 through N, where N is an integer greater than 1. A plurality of modem devices are coupled to the virtual local area network device. The plurality of modem devices are numbered from 1 through N, where each of the plurality of modem devices being coupled respectively to one of the plurality of second input/output ports and where each of the plurality of modem devices also being coupled to one of a plurality of power lines numbered from 1 through N, each of the power lines being capable of communicating information to and from the second data source connection.

19 Claims, 24 Drawing Sheets

U.S. PATENT DOCUMENTS

| | | |
|---|---|---|
| 6,243,413 B1 * | 6/2001 | Beukema .................... 375/222 |
| 6,272,551 B1 * | 8/2001 | Martin et al. ............... 709/250 |
| 6,343,079 B1 * | 1/2002 | Way et al. .................. 370/401 |
| 6,388,564 B1 | 5/2002 | Piercy et al. |
| 6,560,319 B1 | 5/2003 | Binder |
| 6,668,058 B1 | 12/2003 | Grimes |
| 6,668,328 B1 * | 12/2003 | Bell .......................... 713/300 |
| 6,757,368 B1 | 6/2004 | Binder |
| 6,775,121 B1 | 8/2004 | Chaudhry |
| 6,842,459 B1 | 1/2005 | Binder |
| 6,880,020 B1 * | 4/2005 | Rubinstein et al. ......... 709/250 |
| 6,885,674 B1 * | 4/2005 | Hunt et al. ................. 370/420 |
| 6,904,134 B1 * | 6/2005 | Jeon et al. ............... 379/93.07 |
| 6,927,340 B1 | 8/2005 | Binder et al. |
| 6,947,409 B1 * | 9/2005 | Iwamura .................... 370/345 |
| 6,958,680 B1 * | 10/2005 | Kline .................... 340/310.11 |
| 6,965,302 B1 * | 11/2005 | Mollenkopf et al. ........ 375/259 |

FOREIGN PATENT DOCUMENTS

| | | |
|---|---|---|
| DE | 100 12 235 C2 | 12/2001 |
| DE | 100 47 648 A1 | 4/2002 |
| DE | 101 03 53 A1 | 8/2002 |
| DE | 100 59 564 A1 | 9/2002 |
| DE | 101 190 39 A1 | 12/2002 |
| DE | 101 190 40 A1 | 12/2002 |
| DE | 100 42 958 C2 | 1/2003 |
| EP | 0 822 721 A2 | 2/1998 |
| EP | 1 043 866 A2 | 10/2000 |
| EP | 1 251 646 A2 | 10/2002 |
| WO | 01/63787 A1 | 8/2001 |
| WO | 02/37712 A1 | 5/2002 |

* cited by examiner

METHOD AND SYSTEM FOR VIRTUAL POWERLINE LOCAL AREA NETWORKS

CROSS-REFERENCES TO RELATED APPLICATIONS

This application claims priority to U.S. Provisional Application No. 60/508,482 filed Oct. 3, 2003, which is hereby incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to power line networking techniques. More particularly, the invention provides a method and system for a high speed power line network in a virtual environment. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Powerline Communication, commonly called PLC. Powerline communication relies upon pre-existing powerlines that are used to supply electrical power distributed through buildings, such as homes and office structures. Conventional PLC relies upon radio frequency technologies. Although powerline communications have been successful in part, many limitations still exist.

For example, powerline communication generally has limited security features. That is, network capability is often distributed throughout the powerline network and is available for use for any particular users. User's can often "see" each other through the network and lack security or privacy. Additionally, powerline networks are also often difficult to implement. There does not seem to be any easy to use technique that provides security and applications for conventional power line systems and structures. PLC also cannot effectively serve and support wide area networks and/or even local area network environments, such as those provided in hotels, hospitals, airports, office buildings, etc. Bandwidth limitations have plagued PLC technologies as well. These and other limitations have been described throughout the present specification and more particularly below.

From the above, it is seen that improved techniques for powerline networks are highly desired.

BRIEF SUMMARY OF THE INVENTION

According to the present invention, techniques for power line networking techniques are provided. More particularly, the invention provides a method and system for a high speed power line network in a virtual environment. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a system of using PLC in a network solution such as local area network and specifically, but not limited to, in a commercial environment such as a hotel, a hospital, an office building, etc. In certain embodiments, the system provides a cascade of a plurality of PLC switches in order to maintain security and privacy. Depending upon the embodiment, the invention also provides apparatus for a PLC repeater, PLC VLAN, PLC Ethernet Wall Mount, PLC Wireless Access Point, and PLC network jack. Still further, the invention provides a method and system for operating the PLC system using computer software and hardware according to certain embodiments. Various other embodiments have been described in more detail below.

In a specific embodiment, the present invention provides a system for powerline networking. The system has an external data source, which is derived from a world wide networks of computers. A router is coupled to the external data source and coupled to a first datasource connection. A powerline network apparatus is coupled to the first datasource connection. The apparatus has a second datasource connection, which is coupled to the first data source connection. The apparatus also has a powerline device coupled to the second datasource connection. Preferably, the powerline device is adapted to receive and transmit information in a first format from the second data source connection and adapted to receive and transmit information in a second format. The apparatus also has a virtual local area network device including a first input/output port and a plurality of second input/output ports. Each of the second input/output ports is numbered from 1 through N, where N is an integer greater than 1. A plurality of modem devices are coupled to the virtual local area network device. The plurality of modem devices are numbered from 1 through N, where each of the plurality of modem devices being coupled respectively to one of the plurality of second input/output ports and where each of the plurality of modem devices also being coupled to one of a plurality of power lines numbered from 1 through N, each of the power lines being capable of communicating information to and from the second data source connection.

In an alternative specific embodiment, the invention provides an apparatus for powerline virtual local area networking. The apparatus has a datasource connection, which is coupled to a data source. The apparatus also has a powerline device coupled to the datasource. The powerline device is adapted to receive and transmit information in a first format from the datasource and is adapted to receive and transmit information in a second format. The apparatus also has a virtual local area network device that includes a first input/output port and a plurality of second input/output ports. Each of the second input/output ports numbered from 1 through N, where N is an integer greater than 1. The apparatus also has a plurality of modem devices coupled to the virtual local area network device. The plurality of modem devices are numbered from 1 through N. Each of the plurality of modem devices is coupled respectively to one of the plurality of second input/output ports. Each of the plurality of modem devices is also coupled to one of a plurality of power lines numbered from 1 through N. Each of the power lines is capable of communicating information to and from the data source.

In yet an alternative specific embodiment, the invention provides a method for converting a plurality of power lines in at least a building structure into a communication network for a plurality of users. The method includes coupling an apparatus for communicating between a data source and at least one of a plurality of users through a power line network. The apparatus has a datasource connection, which is coupled to a data source. The apparatus also has a powerline device coupled to the datasource. The powerline device is adapted to receive and transmit information in a first format from the datasource and is adapted to receive and transmit information in a second format. The apparatus also has a virtual local area network device that includes a first input/output port and a plurality of second input/output ports. Each of the second input/output ports numbered from 1 through N, where N is an integer greater than 1. The apparatus also has a plurality of modem devices coupled to the virtual local area network device. The plurality of modem devices are numbered from 1 through N. Each of the plurality of modem devices is coupled respectively to one of the plurality of second input/output ports. Each of the plurality of modem devices is also coupled to one of a plurality of power lines numbered from 1 through N. Each of the power lines is capable of communicating information to and from the data source. Once the apparatus has been coupled to the powerline network, the method includes allowing at least one of the users to communicate to the data source through one of the plurality of power lines. Alternatively or concurrently, the method includes denying access to at least one of the users from communicating to the data source through one of the plurality of power lines.

Still further, the invention provides an apparatus for powerline communications. The apparatus has a face plate structure including a first side and a second side. The first side includes an outlet (e.g., CAT 5 cable type) for data communications and a power outlet for AC power. The apparatus also has a housing (e.g., enclosure) coupled to the backside of the face plate structure. A DC power supply is coupled to and within the housing. A network device includes a first port and a second port. The network device is coupled to and within the housing. The network device is also coupled to the DC power supply. A powerline device includes a first powerline port and a second powerline port. The powerline device is coupled to and within the housing. The powerline device is coupled to the DC power supply. The first powerline port is coupled to the second port of the network device. The apparatus also includes a coupler coupled to the second powerline port and is coupled to the outlet for data communications. An AC connector is coupled to the housing and is coupled to the DC power supply. The AC connector is coupled to the first port of the network device. The present apparatus can be used to replace conventional AC face plates to convert them for powerline networking applications.

In yet an alternative specific embodiment, the invention provides an apparatus for powerline communications. The apparatus has a removable network jack structure including an outlet for data communications. The apparatus has a housing coupled to the network jack structure. A DC power supply is coupled to and within the housing. A network device including a first port and a second port is coupled to and within the housing. Preferably, the network device is coupled to the DC power supply. A powerline device including a first powerline port and a second powerline port is coupled to and within the housing. The powerline device is coupled to the DC power supply. The first powerline port is coupled to the second port of the network device. Additionally, a coupler is coupled to the second powerline port and is coupled to the outlet for data communications. Preferably, the coupler is coupled to and within the housing. An AC connector is coupled to the housing and is coupled to the DC power supply. The AC connector is coupled to the first port of the network device. In a specific embodiment, the AC connector is operably coupled to the housing through a pivoting device. The AC connector is adapted to protrude from the housing to be insertable into an AC wall outlet in a first position and the AC connector is adapted to fold toward the housing about the pivoting device in a second position.

Numerous benefits are achieved using the present invention over conventional techniques. The present invention can be applied using conventional components from computer networking and hardware technologies. Additionally, the invention can be applied to pre-existing powerline structures without substantial modification. Preferably, the present system and method are easy to implement and also selectively connect and depending upon the user. In preferred embodiments, the invention also provides for security between users. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for power line networking techniques are provided. More particularly, the invention provides a method and system for a high speed power line network in a virtual environment. Merely by way of example, the invention has been applied in a local area network environment, but it would be recognized that other applications exist. The invention can also be applied to building area networking, home networking, office networking, apartments, any combination of these, and other networking applications.

Figure 1:
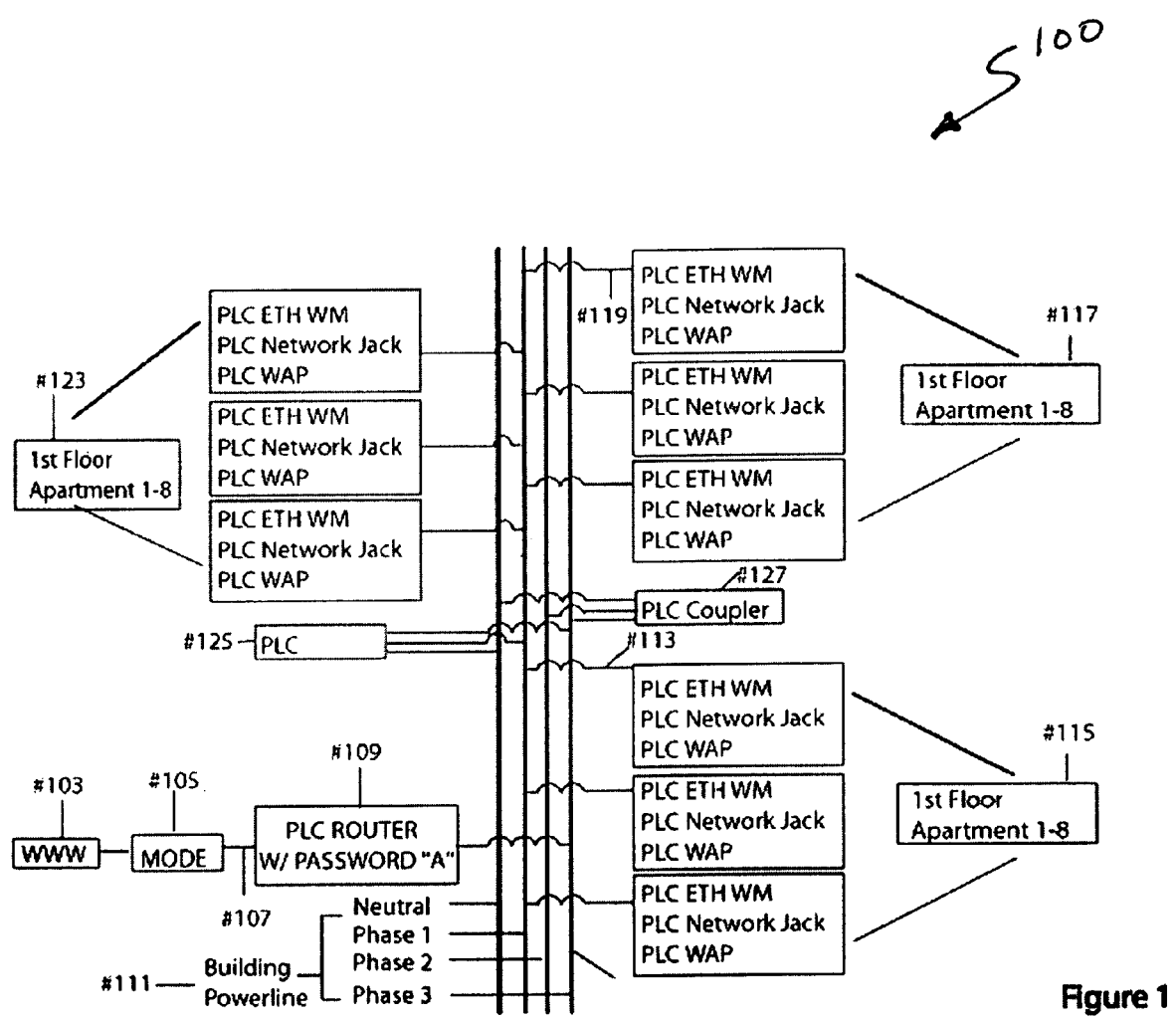
FIG. 1 is a simplified diagram of a powerline system according to an embodiment of the present invention.

FIG. 1 is a simplified diagram of a powerline system 100 according to an embodiment of the present invention. This diagram is merely an example, which should not unduly limit the scope of the claims herein. One of ordinary skill in the art would recognize many variations, alternatives, and modifications. As shown, the system 100 for powerline networking is included. The system 100 has an external data source 103, which is derived from a world wide networks of computers. A modem 105 is coupled to the external data source and is coupled to a first datasource connection 107. A powerline router 109 is coupled to the first datasource connection 107 to provide multiple IP addresses and is then coupled to the electrical wires 111. The powerline router is coupled to the first datasource connection. The router has a second datasource connection, which is coupled to the first data source connection. The second datasource includes the multiple users, which will be described in more detail. Preferably, the router is adapted to receive and transmit information in a first format from the second datasource connection and adapted to receive and transmit information in a second format. The router has a virtual local area network device including a first input/output port and a plurality of second input/output ports. Each of the second input/output ports is numbered from 1 through N, where N is an integer greater than 1. A plurality of modem devices are coupled to the virtual local area network device. The plurality of modem devices are numbered from 1 through N, where each of the plurality of modem devices being coupled respectively to one of the plurality of second input/output ports and where each of the plurality of modem devices also being coupled to one of a plurality of power lines numbered from 1 through N, each of the power lines being capable of communicating information to and from the second data source connection. As merely an example, the powerline router is a product manufactured by Asoka USA Corporation of San Carlos, Calif. under the part number PL9920-BBR.

As noted, the system also includes a plurality of building power lines 111. The building power lines include a first power line P1, a second power line P2, a third power line P3, and neutral. Depending upon the application, there can be fewer power lines or even more powerlines, which may be at the same voltage potentials or different voltages potentials. The present system includes three floors of apartments, including a first floor 115, a second floor 117, and a third floor 123. Each of the floors includes a plurality of power lines from one of the building power lines P1, P2, P3. For example, the first floor, second floor, and third floor are each coupled to P1. Each of the floors include a plurality of apartments, each of which has a power line, 113, 119, 123. Each of the apartments also includes a powerline network switch, which will also be described in more detail below. The system has coupler 127 and PLC repeater 125.

Preferably, the repeater is a suitable powerline device with multiple compatible chipsets communicating with each other over their local host interfaces. Here, the repeater forms two separate networks with the repeater physically located between them. The repeater doubles the useful range of the powerline network and provides higher bandwidth between network nodes that would otherwise have weak or no signal, which is not useful. The repeater could also be used to connect powerline networks that are not on the same physical wire together. This is useful to cross phases in electrical wiring when there is no natural capacitive coupling occuring. It could also be used to connect apartments, rooms etc. to create a shared network that bypasses the electrical meters that otherwise often blocks the powerline signal. Each of these elements will be described in more detail throughout the present specification and more particularly below.

Figure 2:
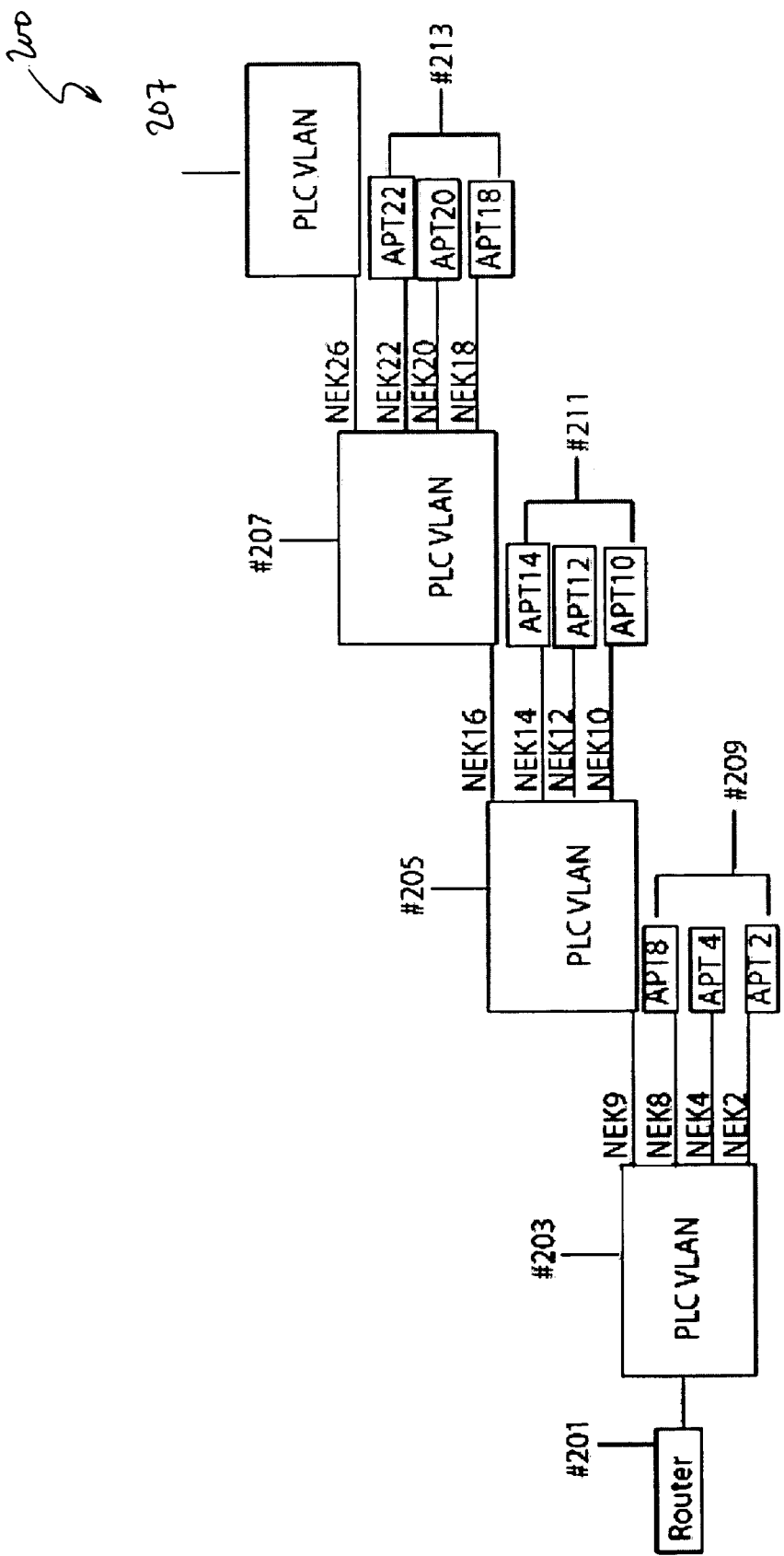
FIG. 2 is a simplified block diagram of a powerline system illustrating the method of cascading according to an alternative embodiment of the present invention.

FIG. 2 is a simplified block diagram of a powerline system 200 according to an alternative embodiment of the present invention. This diagram is merely an example, which should not unduly limit the scope of the claims herein. One of ordinary skill in the art would recognize many variations, alternatives, and modifications. As shown, the system illustrates a method of cascading the PLC VLAN to ensure additional privacy and security. As shown, the system includes a router 201 with a specific Network Encryption Key (NEK) that is coupled to a PLC VLAN 203. A NEK is a unique number used to encrypt data transmitted on the network. This NEK is used by PLC switch 203, 205, and 207, so one NEK serves as a backbone NEK. Each PLC VLAN serves 1 to N network nodes using a different NEK for each connection. This is the NEK programmed into the end user's powerline device, such as the PLC Ethernet Wall Mount, PLC Wireless Access Point, and PLC Network Jack. Alternatively, the PLC VLAN can connect to another PLC VLAN to further increase the number of end units, as shown in 203, 205, 207. These PLC VLAN will communicate with an intermediate NEK. The PLC VLAN and routers may be connected using any network technology and are not restricted to using powerline communications. The PLC VLAN are internally using non-encrypted data. To separate the end users and prevent the PLC VLAN from connecting the users together, VLAN technology is used to limit the forwarding of data between an end user and the downstream network connection, and not forward packets between end user nodes. This method works in the case where network access is either on or off. In a situation where the user can access a local network but not another network, such as the Internet, a different method has to be implemented with packet filtering performed in the router. Each PLC VLAN would have plurality of network ports, generally 8 or 24 ports. Whereas, each additional PLC VLAN on the network is then cascaded by plugging into a port of the previous PLC VLAN as shown in 203, 205, and 207. Although three PLC VLAN are shown, there can also be others provided in the cascaded deployment. Each of the ports couples to an output port via power line at a plurality of apartments or other user locations through either a PLC Ethernet Wall Mount, PLC Wireless Access Point, or PLC Network Jack, 209, 211, 213. PLC VLAN 203 includes a plurality of output ports, each with a unique network encryption key (NEK) NEK2, NEK3, NEK7, NEK 8, and NEK 9. NEK2, NEK3, NEK7, and NEK 8 connect respectively to apartments 1, 2, 7, and 8. Output line NEK 9 feeds into a second switch 205, which is configured in a similar manner. The cascaded design can be scaled up using an output port from any of the switches. Such output port would feed into another 1 by N switch, where N is an integer greater than 1. Preferably, each of the user's cannot see another user in the cascaded switch deployment. As shown, the cascaded switch deployment allows the system to be scaled up using switches of fixed port size, e.g., 1 by 8. Each of the user's shares bandwidth capacity of the network. Depending upon the embodiment, there can be other cascaded employments.

Figure 3:
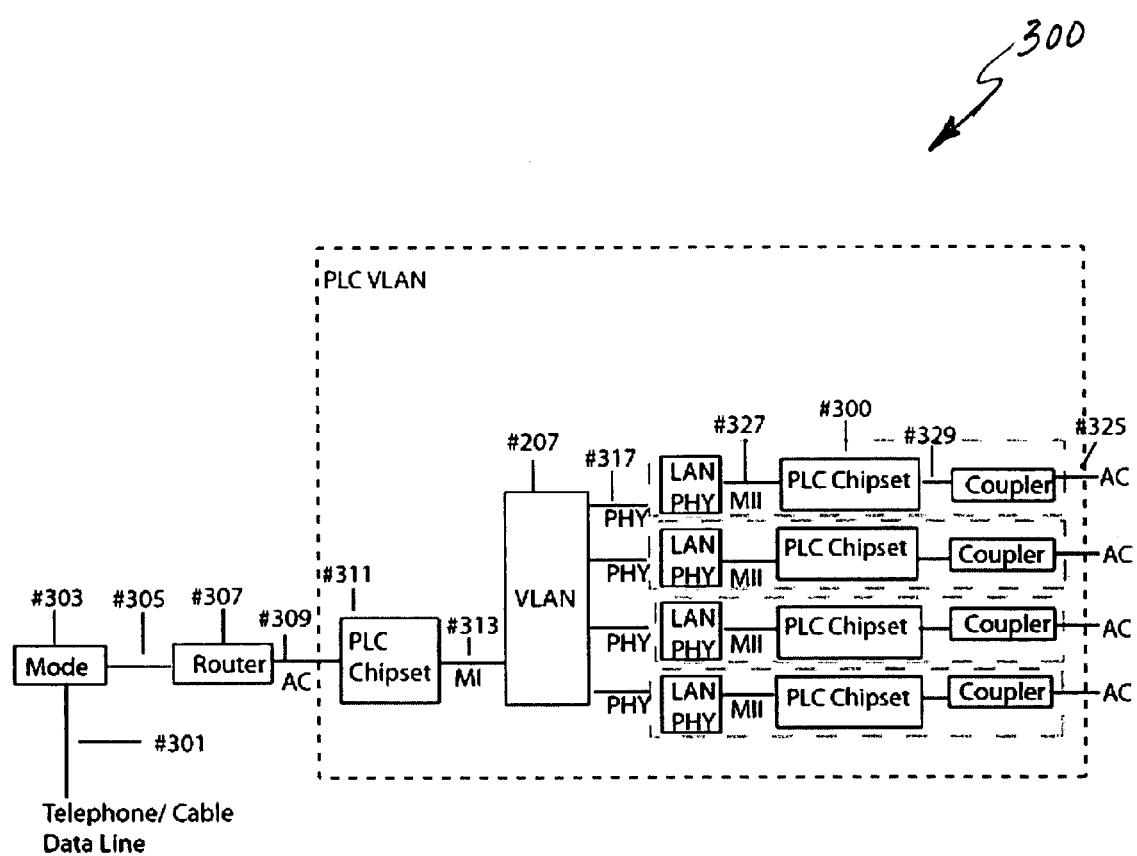
FIG. 3 is a more detailed block diagram of a powerline VLAN apparatus according to an embodiment of the present invention.

FIG. 3 is a more detailed block diagram of a powerline apparatus 300 according to an embodiment of the present invention. This diagram is merely an example, which should not unduly limit the scope of the claims herein. One of ordinary skill in the art would recognize many variations, alternatives, and modifications. As shown, the apparatus 200 for powerline virtual local area networking. The apparatus has a datasource connection 301, which is coupled to a data source. The apparatus also has a powerline device 311 coupled to the datasource. In certain embodiments, other elements including modem 303 and router 307 are also coupled to the data source. Line 305 interface between the modem and router and power line 309 interfaces between router and powerline device. The powerline device is adapted to receive and transmit information in a first format from the datasource and is adapted to receive and transmit information in a second format. The second format may include MII, GPSI, and other suitable techniques.

As merely an example, the power line device can be an integrated circuit chip manufactured by INTELLON CORPORATION of Florida. Here, the chip can be a single-chip powerline networking controller with integrated MII/GPSI, USB. The chip interfaces with Ethernet interfaces, among others. Preferably, there is at least a 14 Mbps data rate on the powerline, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the powerline device can also include other chip designs that are suitable for the present methods and systems.

The apparatus also has a virtual local area network device 315 that includes a first input/output port via MII 327 and a plurality of second input/output ports 317. Each of the second input/output ports numbered from 1 through N, where N is an integer greater than 1. The apparatus also has a plurality of modem devices 329 coupled to the virtual local area network device. The plurality of modem devices are numbered from 1 through N. Each of the plurality of modem devices is coupled respectively to one of the plurality of second input/output ports. Each of the plurality of modem devices is also coupled to one of a plurality of power lines numbered 325 from 1 through N. Each of the power lines is capable of communicating information to and from the data source.

Preferably, each of the modem devices include select elements. Such elements include an interface module 319, which is coupled to a PLC chipset, which is coupled to coupler 323. The interface module can be any Ethernet PHY to MII converter, or no converter at all if the switch 319 supports MII interface, as well as others. The PLC chipset is from suitable companies such as Intellon, cogency or Velence or others'. The coupler is a capacitive or inductive coupler. As shown, communication between the interface module and the PLC chipset is MII but can also be others.

Here, MII is an industry standard. The standard provides an interface between the MAC and PHY sub-layers, such as IEEE 802.3 Ethernet MAC controllers from certain sources. MII has separate 4-bit data paths for transmit and receive data along with carrier sense and collision detection. Data are transferred between the MAC and PHY over each 4-bit data path synchronous with a clock signal supplied to the MAC. The MII interface also provides a two-wire bi-directional serial management data interface, which provides access to the status and control registers in the MAC. Further details of the MII can be found in the IEEE 802.3u Standard. The PLC chipset input/outputs information in analog format, which is transmitted through the powerline via the coupler. Of course, there may be variations, alternatives, and modifications. Further details of the PLC chipset can be found throughout the present specification and more particularly below.

Figure 4:
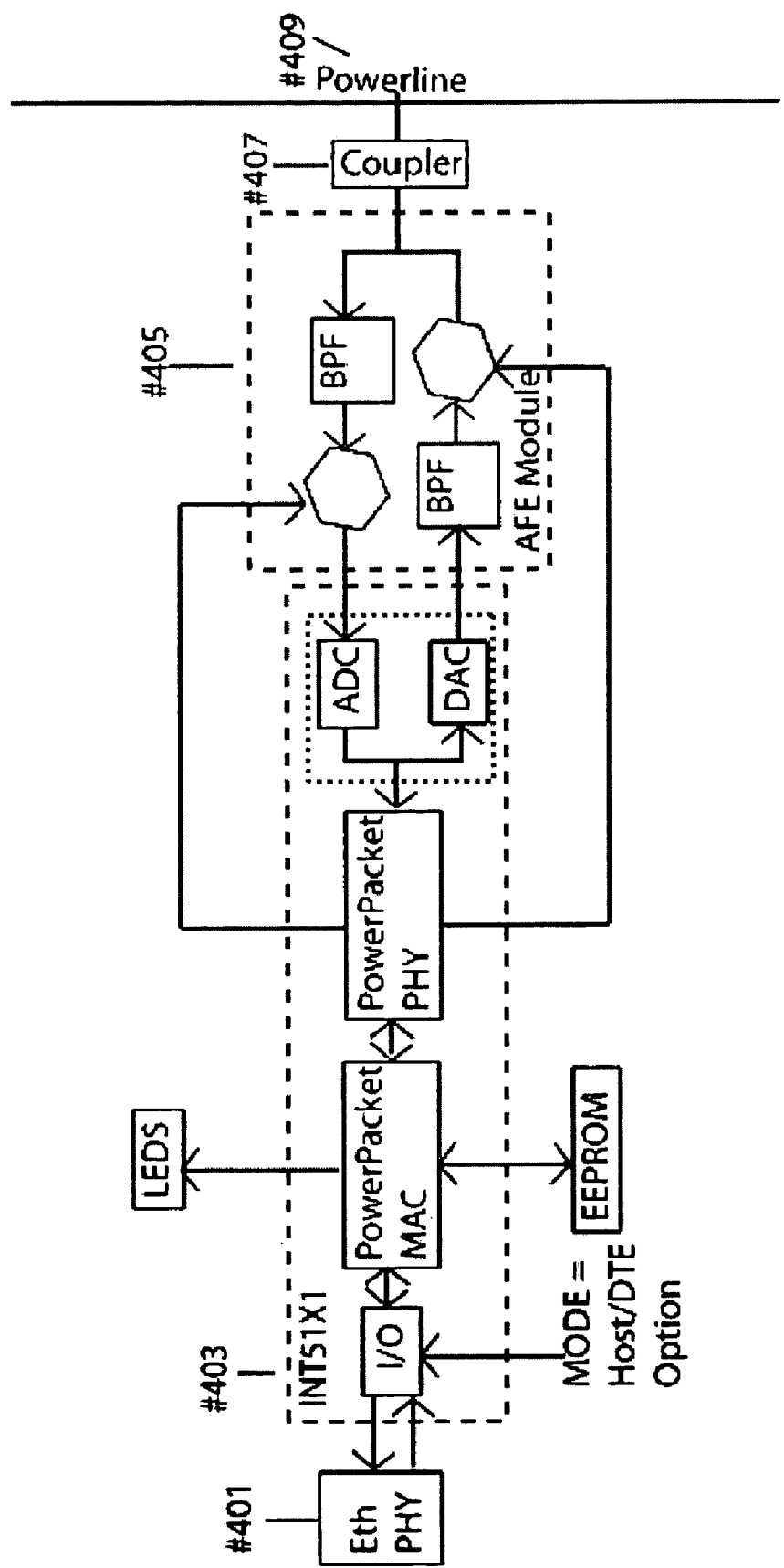
FIG. 4 is a detailed diagram of a powerline chipset according to an embodiment of the present invention.

FIG. 4 is a detailed diagram of a powerline chipset according to an embodiment of the present invention. This diagram is merely an example, which should not unduly limit the scope of the claims herein. One of ordinary skill in the art would recognize many variations, alternatives, and modifications. As shown, the PLC chip set includes various elements. Such elements include the chipset itself 403, which is coupled between Ethernet 401 and an analog front end (AFE) module 405. The AFE module interfaces between the chipset and coupler. The module, which interfaces between the chipset and coupler 407, includes a first band pass filter ("BPF") coupled to a first amplifier, which connects to a coupler 407. The first amplifier couples to a second BPF, which couples to another amplifier, before connecting to an analog to digital converter (ADC). The ADC connects to a digital to analog converter DAC, which feeds back into the first BPF. The coupler connects to a powerline 409. Specific details of the chipset can be found in Technical Reference INT51X1 "Integrated Powerline MAC/PHY Transceiver with USB and ETH Integrated Bridges" by INTELLON Corporation. As noted, the chipset is merely an example and should not unduly limit the scope of the claims herein. Further details of various methods according to the present invention are provided throughout the present specification and more particularly below.

Figure 5:
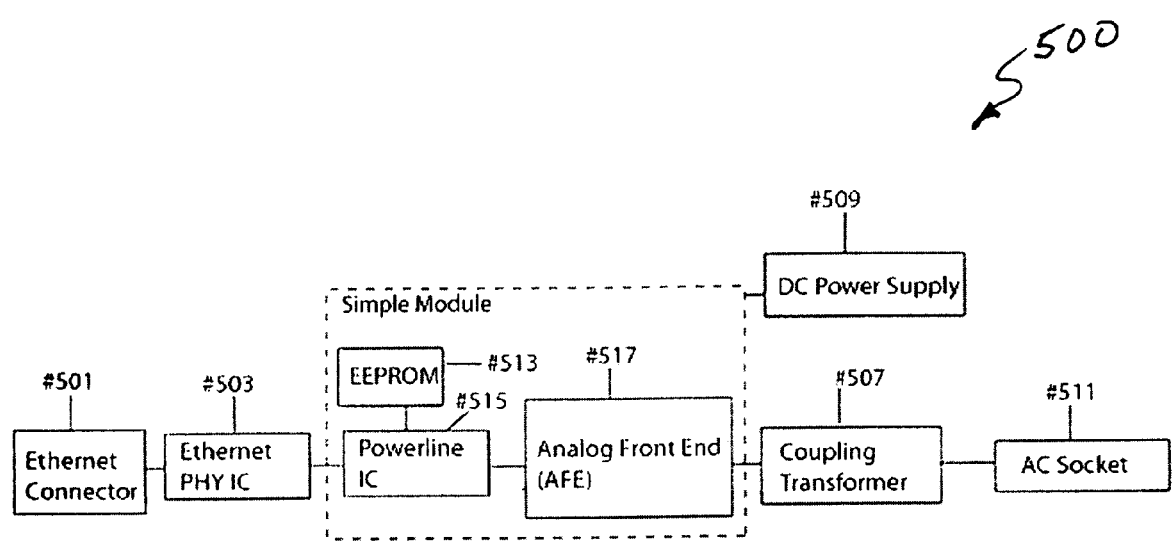
FIG. 5 is simplified block diagram of a network jack apparatus according to an embodiment of the present invention.

FIG. 5 is simplified diagram of a face plate apparatus 500 according to an embodiment of the present invention. This diagram is merely an example, which should not unduly limit the scope of the claims herein. One of ordinary skill in the art would recognize many variations, alternatives, and modifications. As shown, the face plate apparatus 500 includes a variety of features. Such features include a module 505. The module includes a power line IC 515, such as the one described herein. The power line IC is coupled to memory 513 (e.g., EEPROM) (network configuration) and an analog front end module 517. The analog front end module connects to coupling transformer 507, which feeds into an input/output socket 511, e.g., AC socket. A DC power supply 509 is coupled to the coupling transformer and socket. Additional elements include an Ethernet Phy integrated circuit 503 that couples to an Ethernet connection 501. The Ethernet connection is provided via the powerline network. Further details of various methods according to the present invention are provided throughout the present specification and more particularly below.

Figure 6:
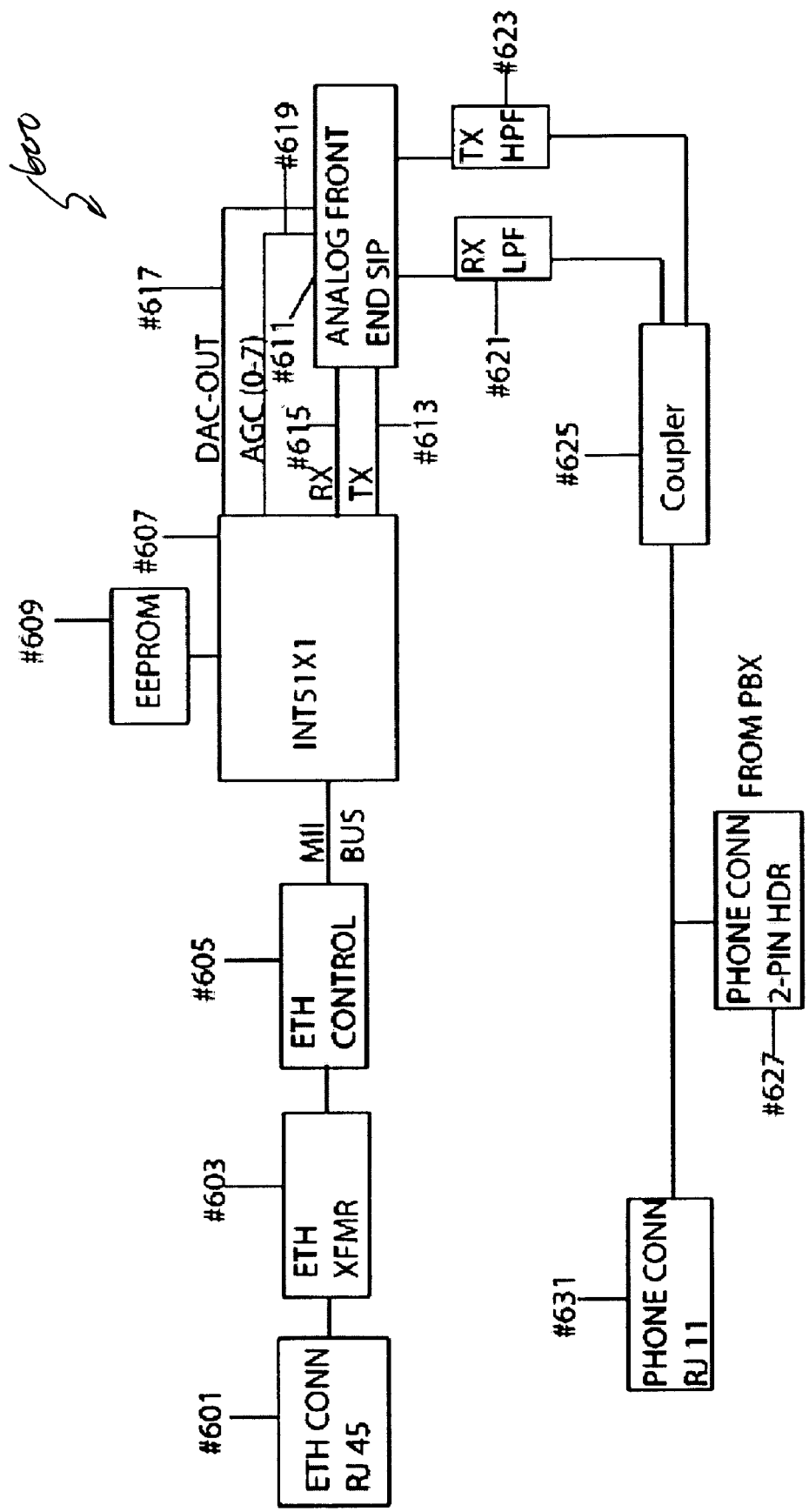
FIG. 6 is a simplified block diagram of a network jack apparatus according to an alternative embodiment of the present invention.

FIG. 6 is a simplified diagram of a face plate apparatus 600 according to an alternative embodiment of the present invention. This diagram is merely an example, which should not unduly limit the scope of the claims herein. One of ordinary skill in the art would recognize many variations, alternatives, and modifications. As shown, the apparatus 600 includes Ethernet connection 601, which is from a powerline network. The Ethernet connection is coupled to Ethernet transformer 603, which couples to Ethernet control 605. An MII communication bus couples the Ethernet control to a PLC chipset 607. The PLC chipset is coupled to memory 609, e.g., EEPROM, and is coupled to an analog front end 611. The analog front end includes amplifiers and band pass filters to condition the signal before and after transmission. The analog front end includes lines receive RX 615 and transmit TX 613. The analog front end also includes DAC out 617 and automatic gain control (AGC) in 619. The analog front end couples to coupler 625, which has a line to a telephone jack 631 and a phone connection, which is from a PBX 627. Of course, there can also be other elements.

Figure 7:
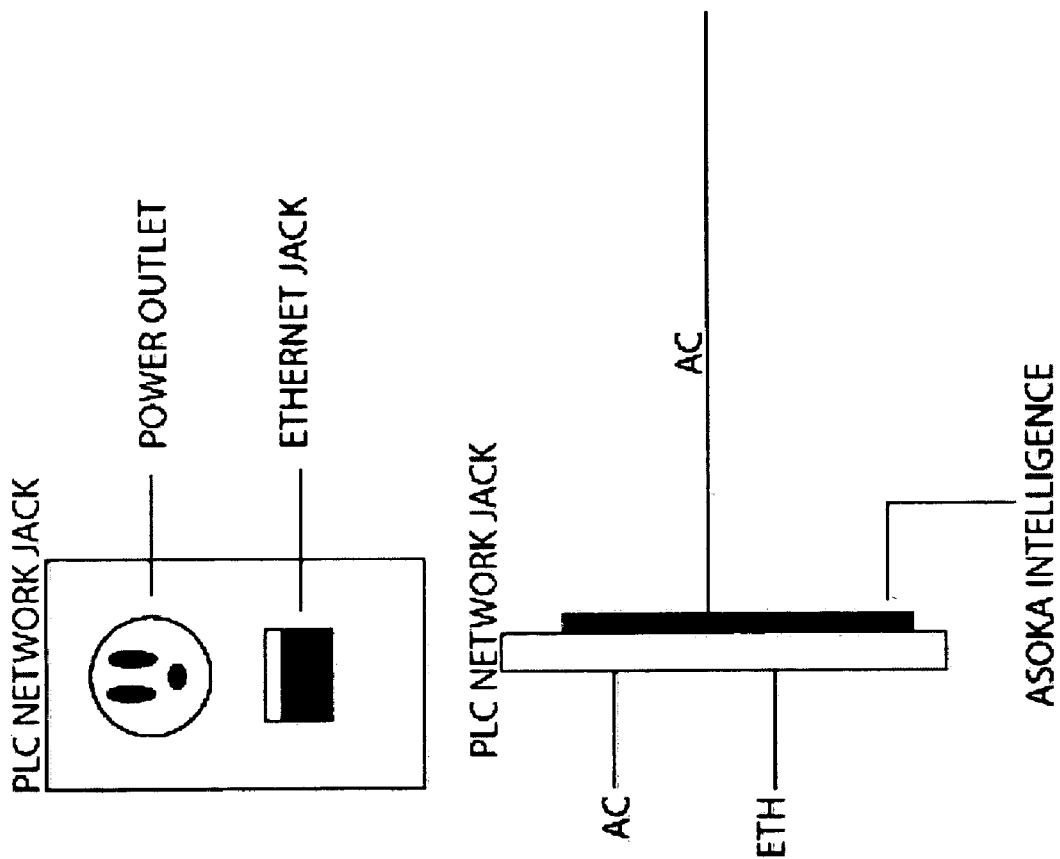
FIG. 7 is a simplified diagram of a network jack apparatus according to yet an alternative embodiment of the present invention.

FIG. 7 is a simplified diagram of a network jack apparatus 700 according to yet an alternative embodiment of the present invention. This diagram is merely an example, which should not unduly limit the scope of the claims herein. One of ordinary skill in the art would recognize many variations, alternatives, and modifications. As shown, the apparatus includes a front view, which includes a power outlet and an Ethernet jack, provided on a network jack. The apparatus also has a side-view that includes a powerline, which outputs AC power and Ethernet. The side-view also includes the network jack and a module that couples to the network jack. Further details of the module are provided throughout the present specification and more particularly below.

Figure 8:
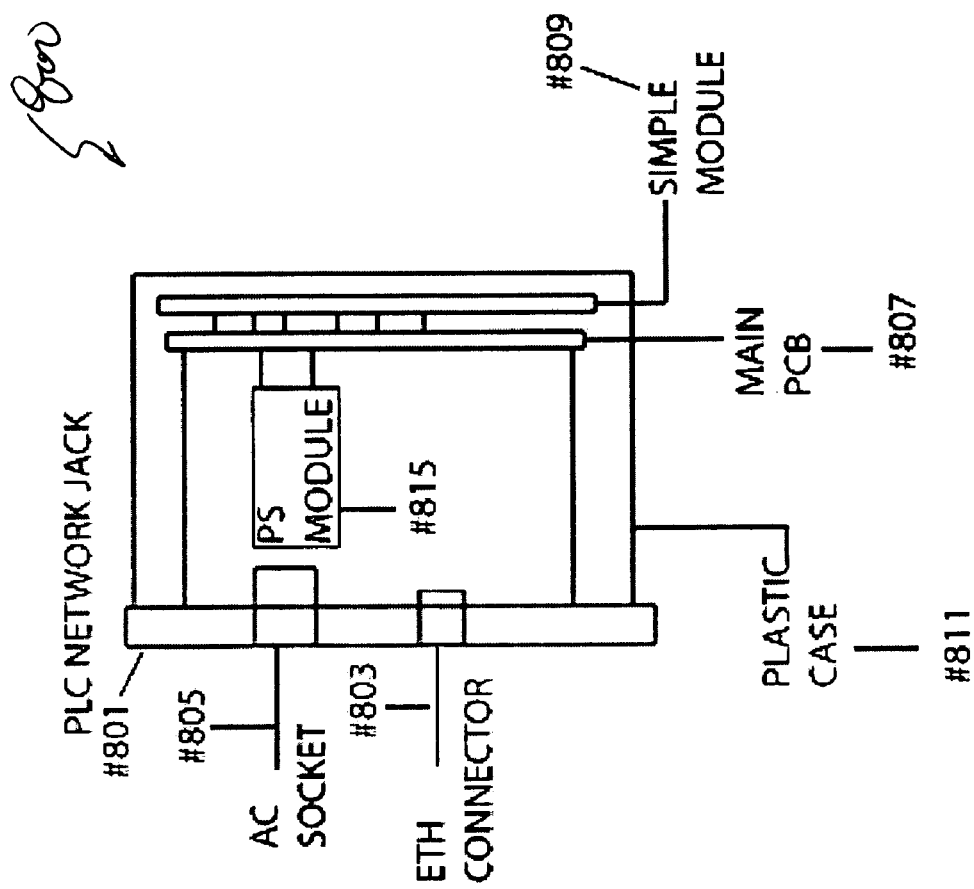
FIG. 8 is a simplified side-view diagram of a network jack apparatus according to an embodiment of the present invention.

FIG. 8 is a simplified side-view diagram of a network jack apparatus according to an embodiment of the present invention. This diagram is merely an example, which should not unduly limit the scope of the claims herein. One of ordinary skill in the art would recognize many variations, alternatives, and modifications. As shown, the network jack apparatus has an outer casing 811. The outer casing is preferably a plastic but can also be a metal or any combination of plastic and/or metal. The apparatus has a network jack 801, which includes an Ethernet connector 803 and an AC socket 805. The network jack looks similar to conventional network jacks but also includes the Ethernet connector or other data connection. The apparatus has two modules 815, 809 that connect to a printed circuit board 807. The modules are the powerline communication module 809, and the AC to DC switching power supply module 815. The board contains an Ethernet PHY chip, a DC-DC converter (e.g., 3.3V), and some high voltage surge protection components to protect the whole circuit from being damaged by a high voltage spike. The apparatus also includes AC wires 813 from the powerline network. Other components may also exist. Also, certain components may be integrated with each other or even separated, depending upon the application.

Preferably, the apparatus is an integrated network jack that allows one to replace a standard electrical outlet to instantly upgrade a facility or location with network connectivity. As an example, embedding the present system converts an Ethernet signal into a powerline signal and vice versa. Preferably, the present apparatus may reduce additional clutter of one network adapter after the other on a desk or office. Various applications may exist. For example, the present apparatus may be used by builders, real estate professionals, and property owners who are looking to upgrade their facility without cumbersome CAT-5 cables. In certain embodiments, the present invention may be used to seamlessly increase a value of a property by replacing certain standard electrical outlets with the present apparatus. Other various of the present apparatus can be found below.

Figure 9:
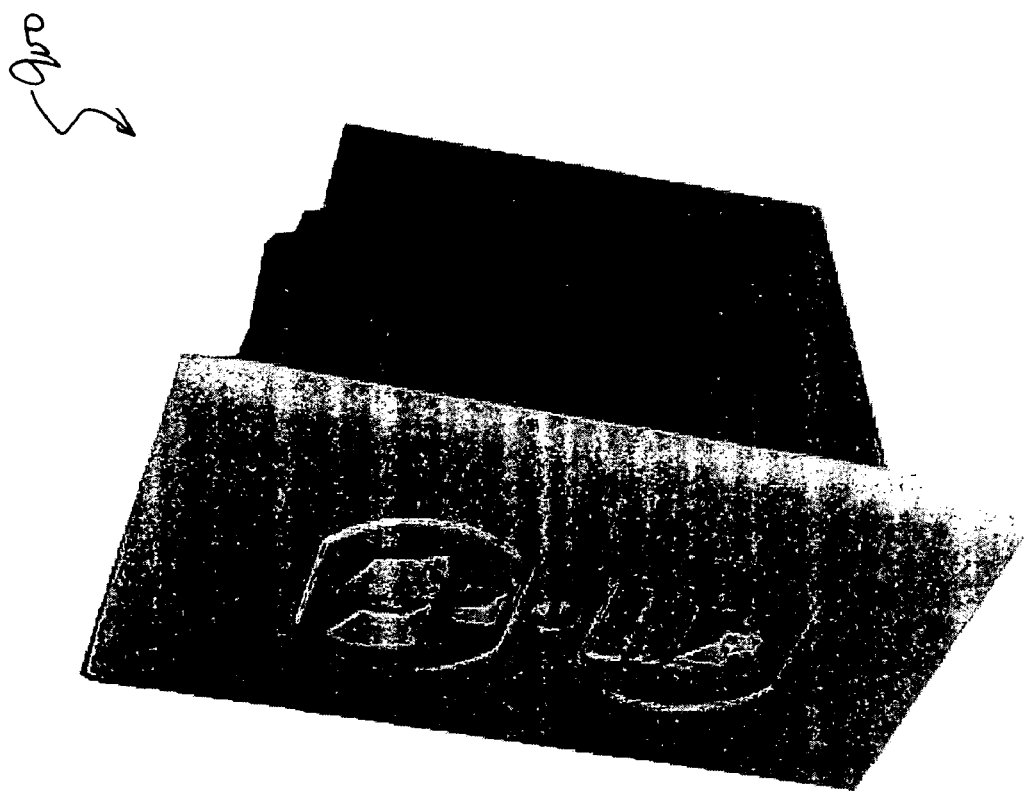
FIG. 9 is a simplified illustration of a network jack apparatus according to an embodiment of the present invention.

FIG. 9 is a simplified illustration of a network jack apparatus 900 according to an embodiment of the present invention. As shown, the face plate apparatus includes the face plate and module, which are integrated to each other. The face plate includes an AC outlet and Ethernet outlet, e.g., CAT 5 connector or the like. The apparatus can be installed onto a building structure, e.g., wall, beam. The apparatus is substantially fixed and replaces conventional AC outlets. This diagram is merely an example, which should not unduly limit the scope of the claims herein. One of ordinary skill in the art would recognize many variations, alternatives, and modifications.

Preferably, the apparatus is housed in a suitable material. Such material can be a plastic box that is constructed with a UL 94V0 approved material. As merely an example, shown on the front-side, the apparatus has a 110 VAC power outlet and an 8-pin Ethernet jack for networking. In the back, it has three electrical pig-tail wires that connect to the 110 VAC power line. The 110 VAC power line is coupled to an Ethernet network, for example. Preferably, the apparatus has a specific form factor, including width, height, and thickness. The width and height are preferably similar to those of conventional network jack for conventional power outlets, e.g., 110V, 120V, 220V, 230V. Depending upon the embodiment, the thickness can extend up to 4 inches, which is measured from the front-side face to the backside. The width is no greater than 16 inches in the backside. The height is no greater than six inches, depending upon the embodiment. Preferably, the apparatus has dimensions of about 7 cm (width)×11.5 cm (length)×7.5 cm (height) and/or 2.75 inches×4.50 inches×3.0 inches (W×H×D). Other embodiments are shown below.

Figure 10:
FIG. 10 is a simplified illustration of a PLC wireless access apparatus with foldable plugs according to an embodiment of the present invention.
Figure 10:
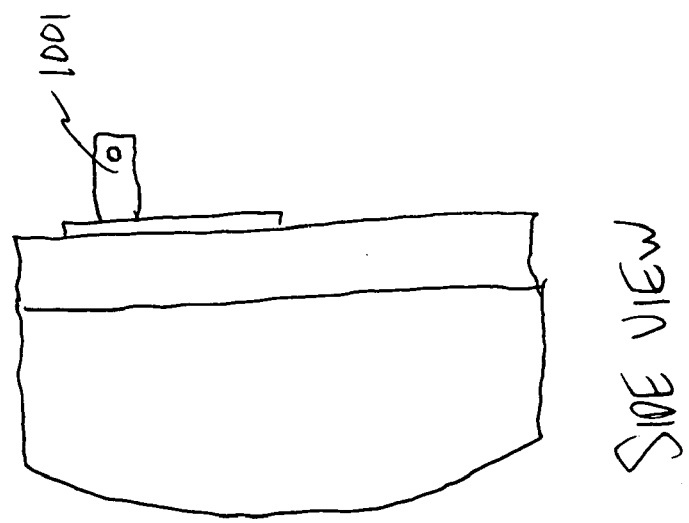
Figure 11:
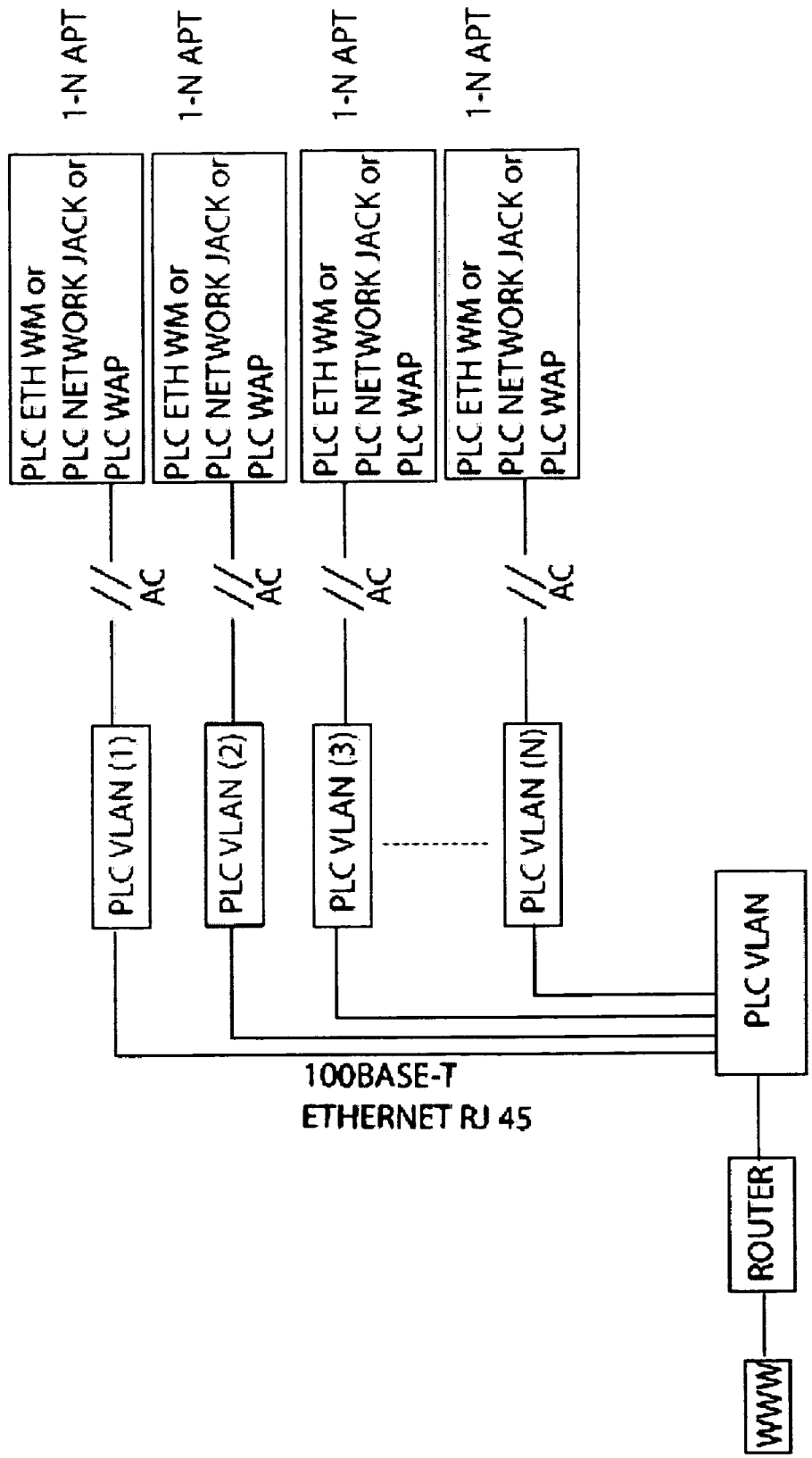
FIGS. 11 through 15 are simplified diagrams illustrating various systems according to embodiments of the present invention.
Figure 12:
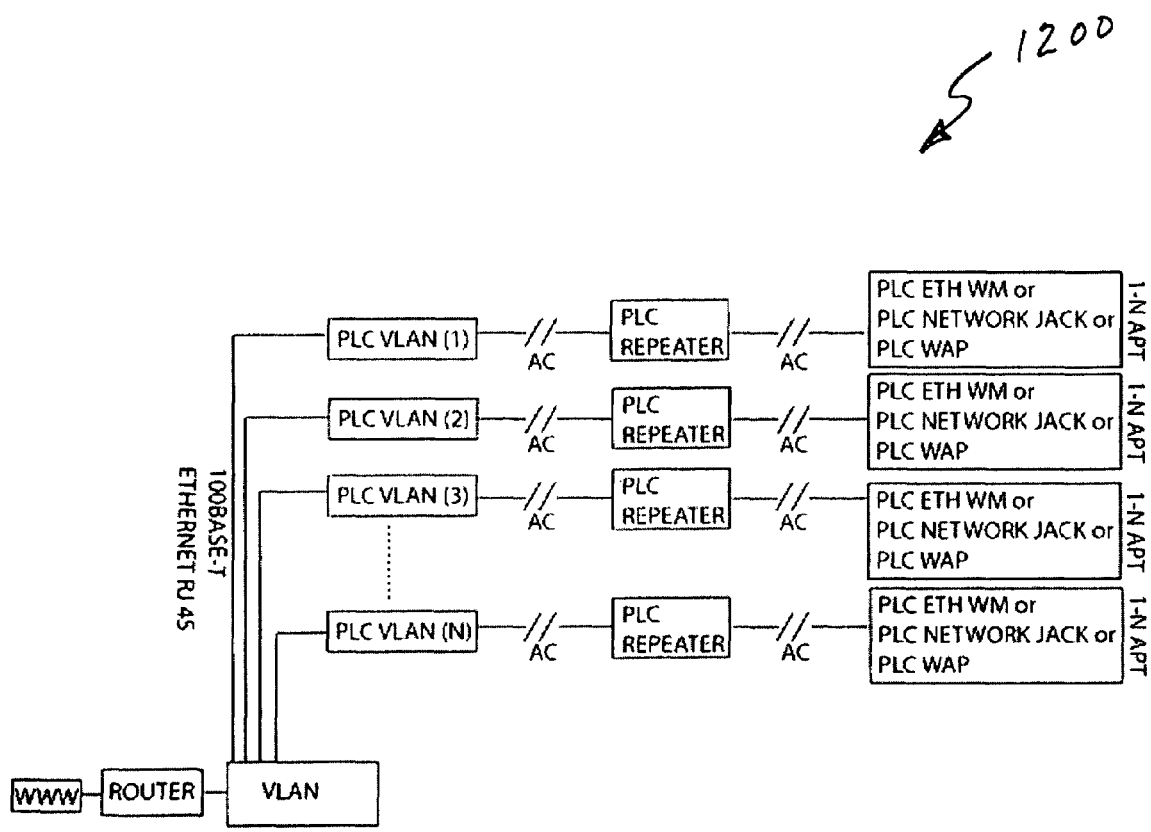
Figure 13:
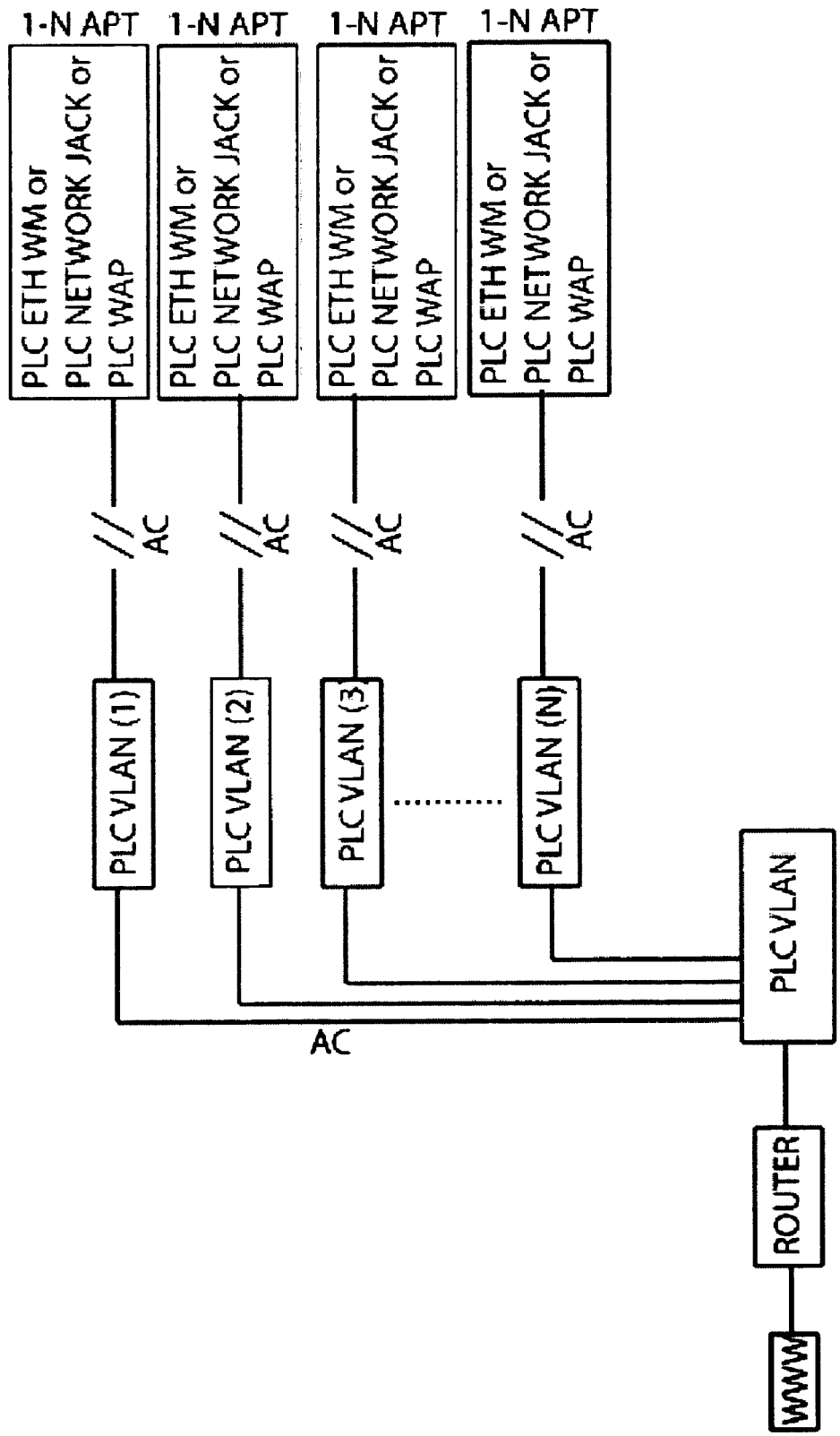
Figure 14:
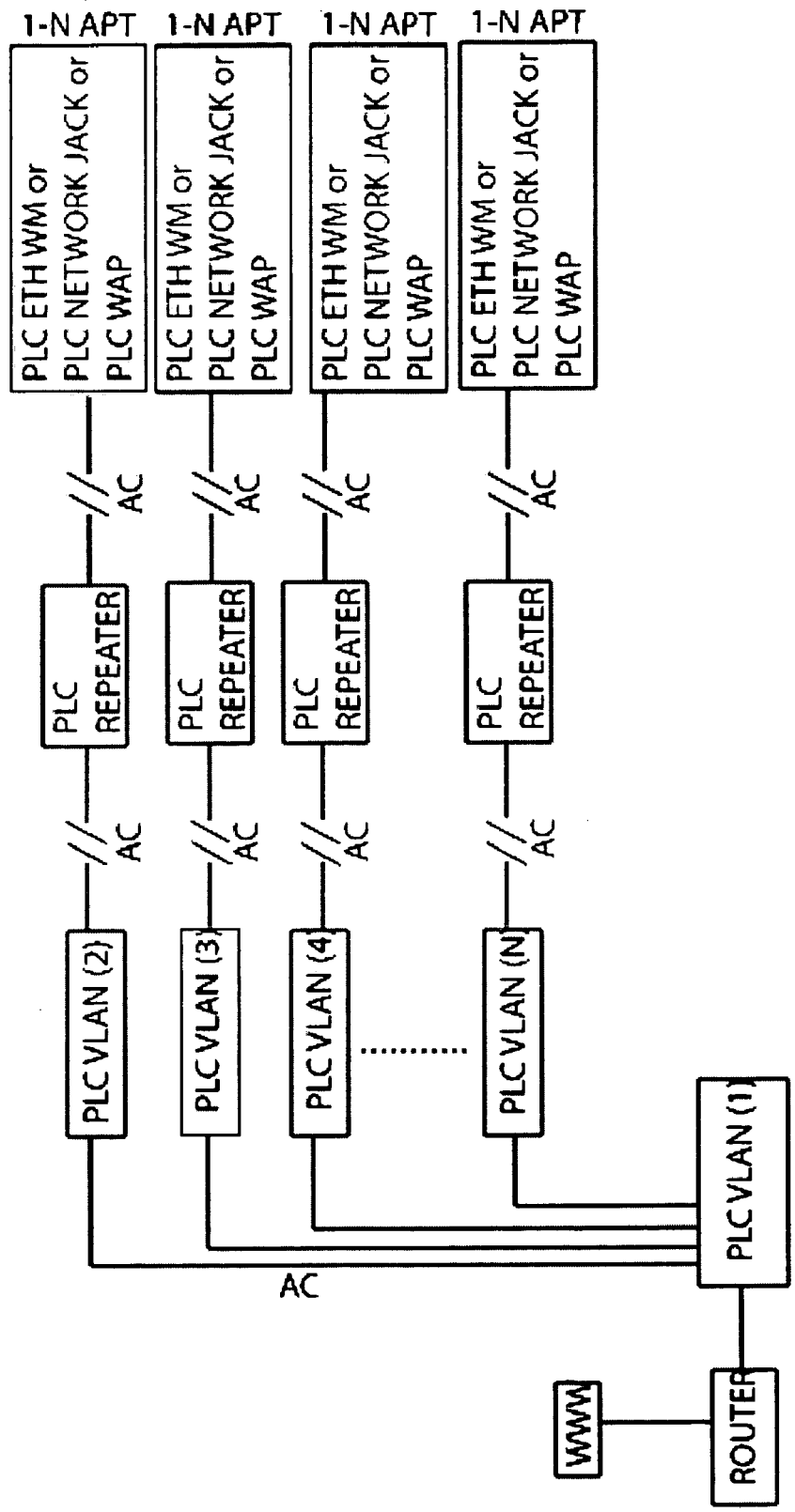
Figure 15:
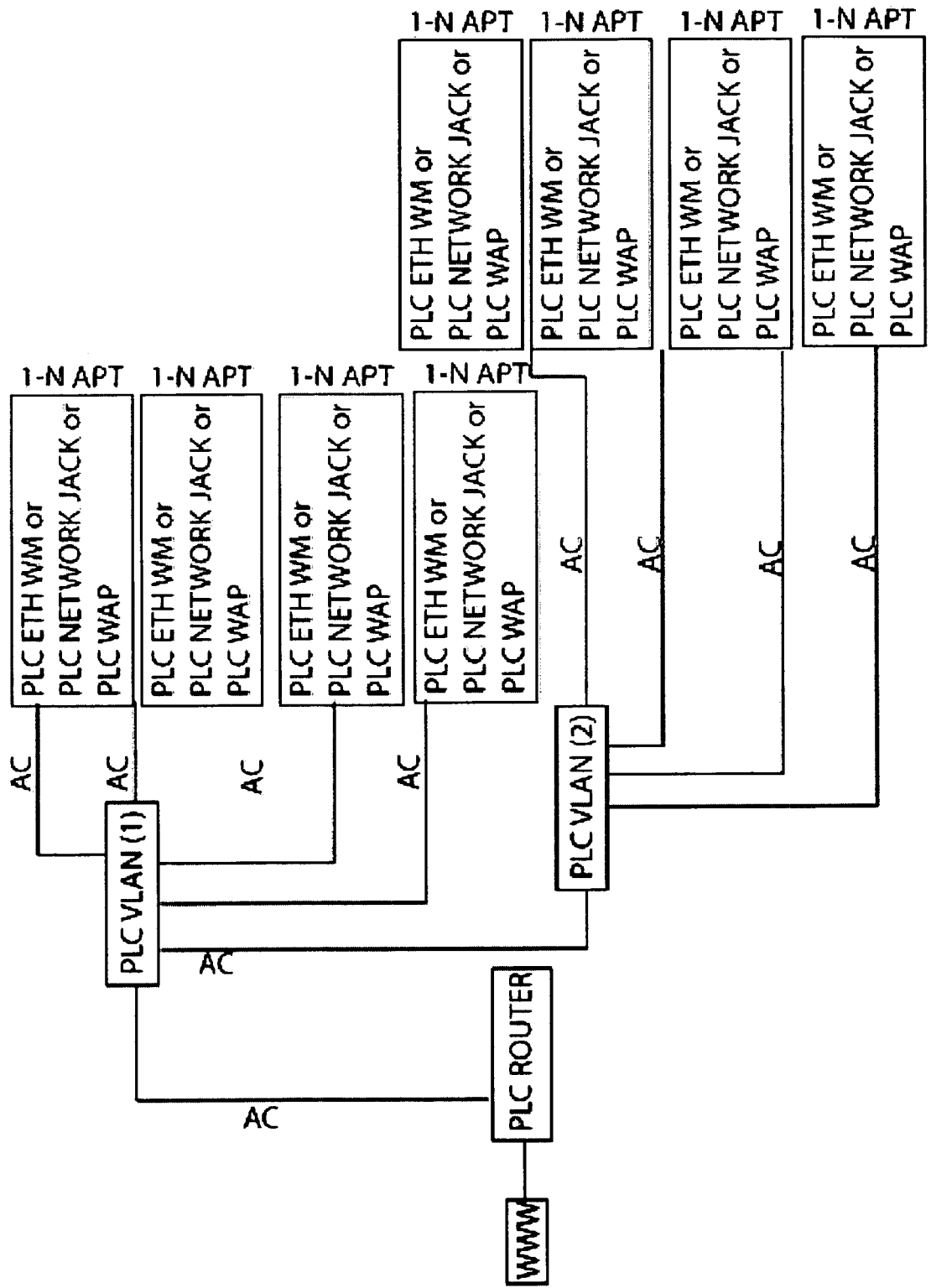

FIG. 10 is a simplified illustration of an alternative network jack apparatus 1000 according to an embodiment of the present invention. This diagram is merely an example, which should not unduly limit the scope of the claims herein. One of ordinary skill in the art would recognize many variations, alternatives, and modifications. As shown, the network jack apparatus includes a standard face plate, which has a plurality of AC outlets. Here, one of the outlets is adapted for powerline communication. The powerline communication is provided through the powerline system, which has been described herein, but can also be others. The network jack apparatus also has a removable face plate adaptor. The adaptor includes a pair of connections (e.g., prongs) 1001 that couples into the standard AC outlet. The adaptor includes a power line module that converts a communication signal provided through the powerline. The adaptor includes an input/output jack to connect to a network interface device. As shown, the apparatus is substantially removable and couples to conventional AC outlets. Various deployment schemes according to embodiments of the present invention are provided in more detail below.

FIGS. 11 through 15 are simplified diagrams illustrating various systems according to embodiments of the present invention. These diagrams are merely examples, which should not unduly limit the scope of the claims herein. One of ordinary skill in the art would recognize many variations, alternatives, and modifications. Each of the elements in the systems have been labeled, e.g., www (world wide web), router, PLC VLAN (powerline communication virtual local area network).

Figure 16:
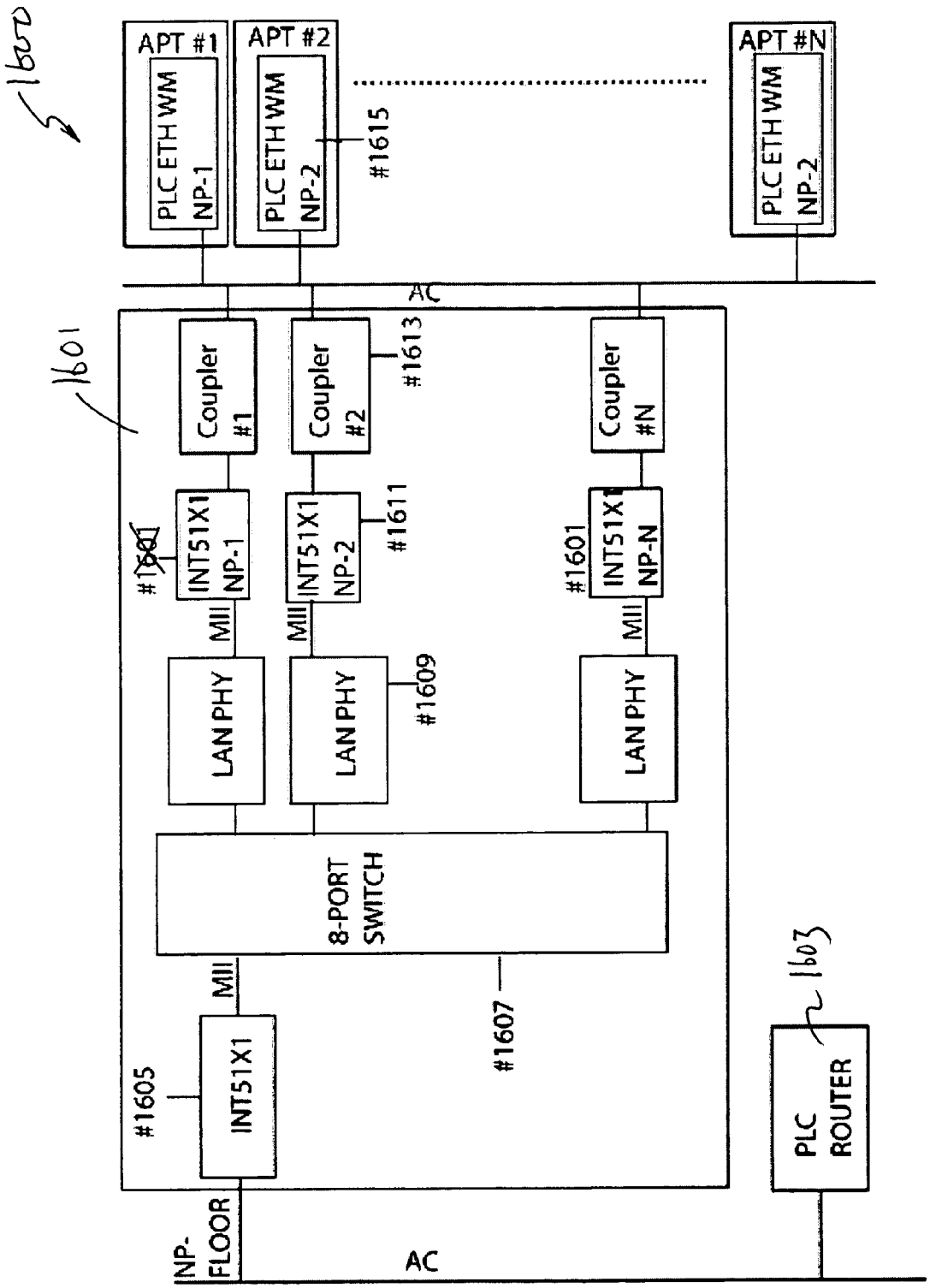
FIG. 16 is a simplified diagram of a repeater apparatus according to an embodiment of the present invention.

FIG. 16 is a simplified diagram of a repeater apparatus 1600 according to an embodiment of the present invention. This diagram is merely an example, which should not unduly limit the scope of the claims herein. One of ordinary skill in the art would recognize many variations, alternatives, and modifications. As shown, the apparatus can be a 1 by N (where N is greater than 1) repeater. A powerline router 1603 couples to a power line, which traverses through a building structure. As the data signal becomes weaker, a repeater 1601 amplifies the data signal. The repeater includes similar elements as those in the previous embodiments. Here, the repeater includes a powerline IC, which couples to a 1×8 switch. The powerline chip communicates to the switch via MII format. The switch includes eight ports. Each of the ports via Phy couples to a LAN Phy chip, which couples to another powerline chip 1611, and communicates via MII. The powerline chip connects to coupler 1613, which couples to a powerline structure. The powerline structure connects to a plurality of apartments, APT 1, APT2, APT8. Each of the apartments includes a face plate apparatus 1615. The face plate apparatus converts the signal from the powerline into a communication format such as Ethernet. Depending upon the embodiment, there can be many variations, modifications, and alternatives.

Figure 17:
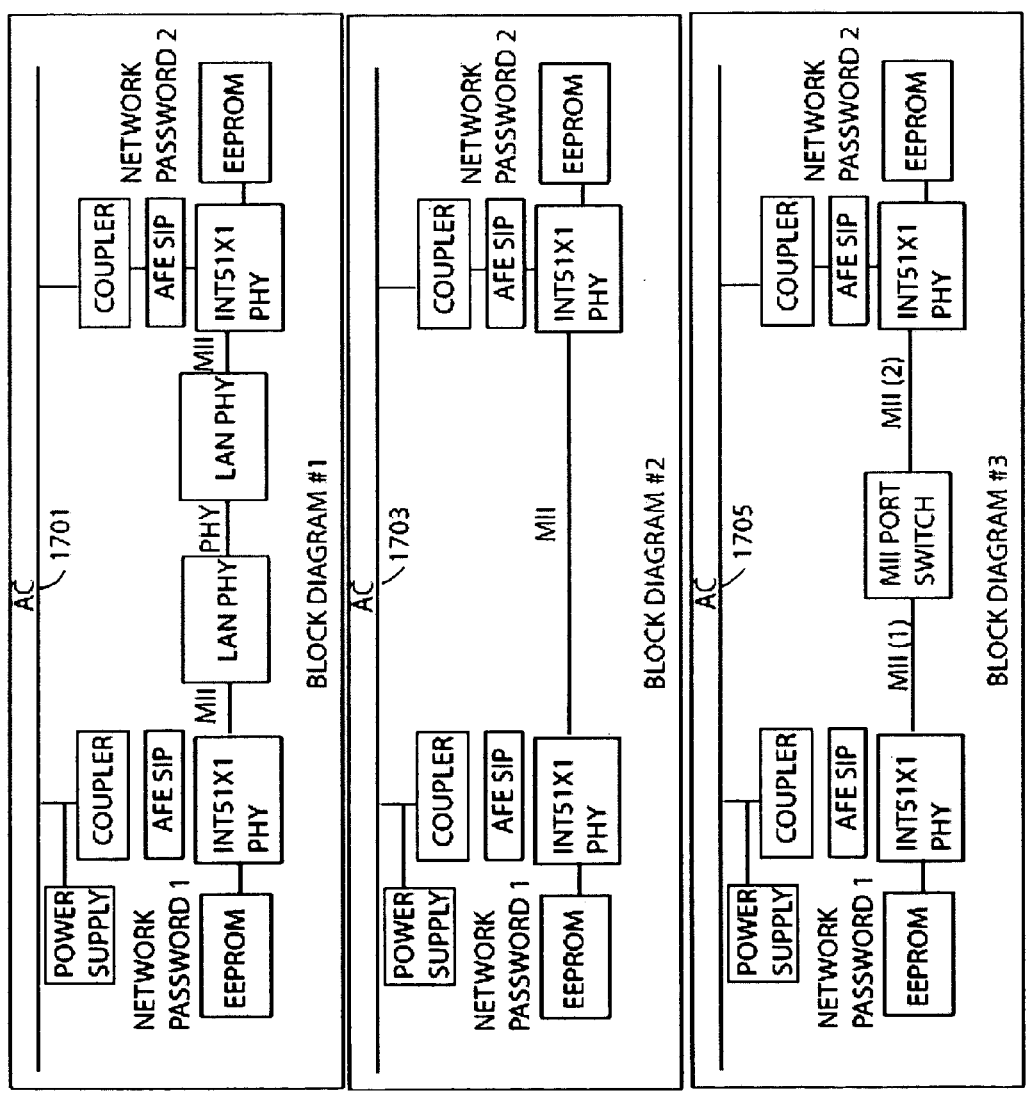
FIG. 17 is a simplified diagram of an alternative repeater apparatus according to an alternative embodiment of the present invention.

FIG. 17 is a simplified diagram of alternative repeater apparatus 1701 according to alternatives embodiment of the present invention. This diagram is merely an example, which should not unduly limit the scope of the claims herein. One of ordinary skill in the art would recognize many variations, alternatives, and modifications. As shown, there are three deployments 1701, 1703, and 1705. Each of these deployments includes a pair of powerline IC's connected back to back. Each of the powerline chips includes a power supply, coupler, analog front end, memory, and the powerline chip itself. Such chips are designed as repeater apparatus for a powerline network. Deployment 1701 includes two LAN Phy chips coupled between each of the powerline ICs. Deployment 1705 includes an MII port. Deployment 1705 includes a two port MII switch. Depending upon the embodiment, there can also be other deployments.

Figure 18:
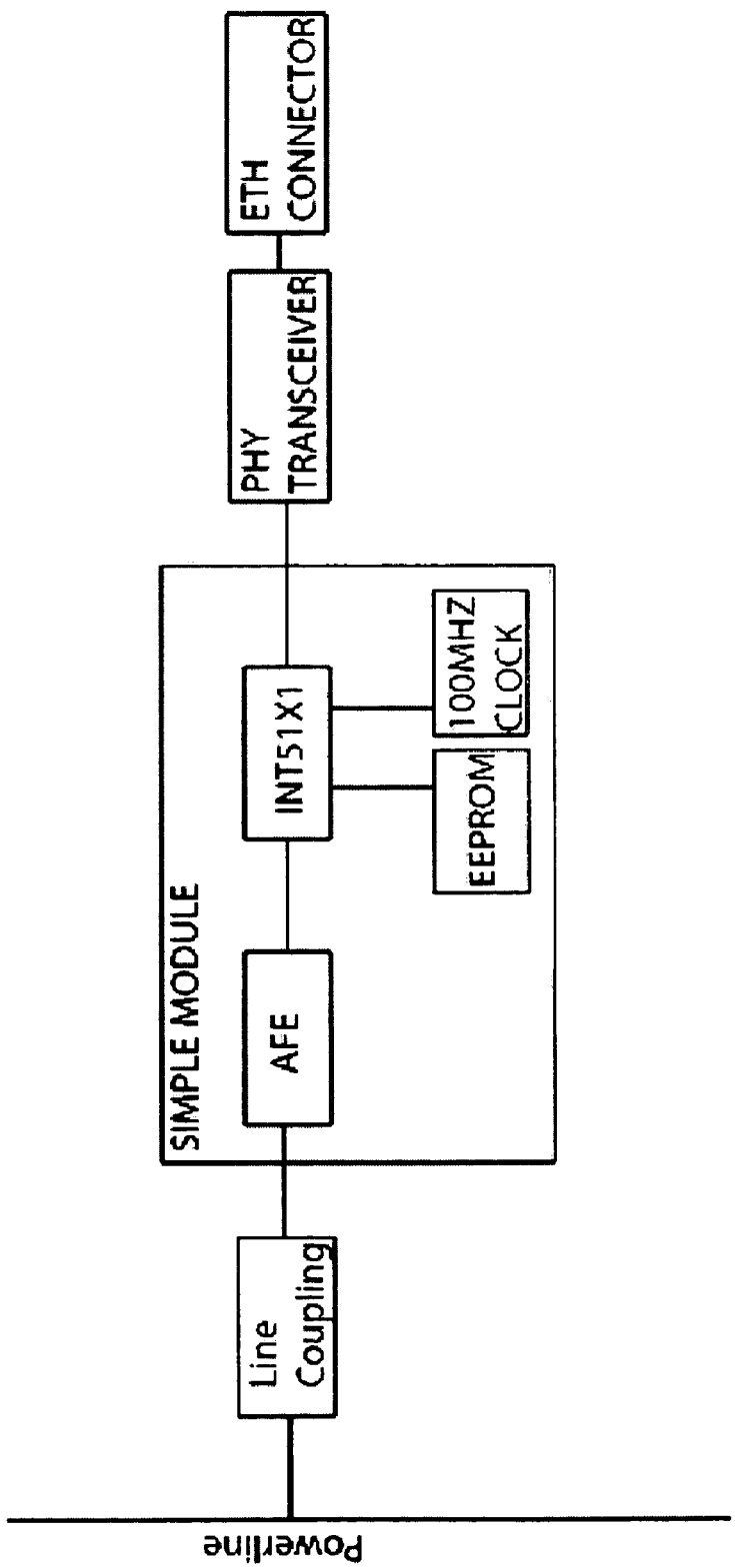
FIG. 18 is a simplified diagram of a PLC Ethernet Wall Mount according to an embodiment of the present invention.

FIG. 18 is a simplified diagram of a PLC Ethernet Wall Mount according to an embodiment of the present invention. This diagram is merely an example, which should not unduly limit the scope of the claims herein. One of ordinary skill in the art would recognize many variations, modifications, and alternatives. As shown, the diagram includes powerline, which is coupled to coupler. The coupler is coupled to the module, which has various elements. The module has an analog front end coupled to a powerline device. The powerline device is coupled to memory and a clock. Also shown are Phy transceiver coupled between the module and Ethernet connector. Other elements can also exist depending upon the embodiment. Each of these elements are provided within a housing such as the ones described herein, but can be others.

Figure 19:
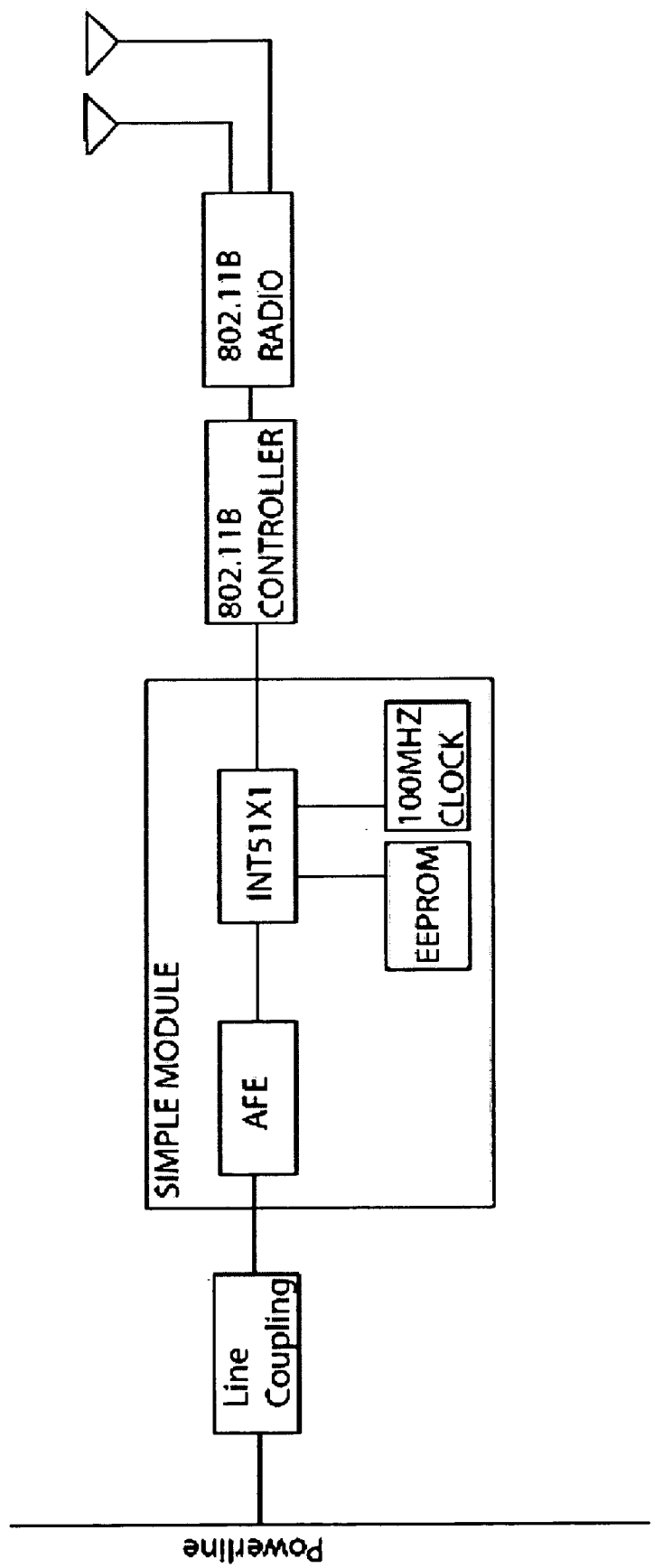
FIG. 19 is a simplified diagram of a PLC wireless access apparatus according to an embodiment of the present invention.

FIG. 19 is a simplified diagram of a PLC wireless access point according to an embodiment of the present invention. This diagram is merely an example, which should not unduly limit the scope of the claims herein. One of ordinary skill in the art would recognize many variations, modifications, and alternatives. As shown, the diagram includes powerline, which is coupled to coupler. The coupler is coupled to the module, which has various elements. The module has an analog front end coupled to a powerline device. The powerline device is coupled to memory and a clock. Also shown are 802.11 controller coupled between an 802.11 transceiver, which is wireless. The wireless access point allows powerline communication in a wireless manner. Other elements can also exist depending upon the embodiment. Each of these elements are provided within a housing such as the ones described herein, but can be others.

Figure 20:
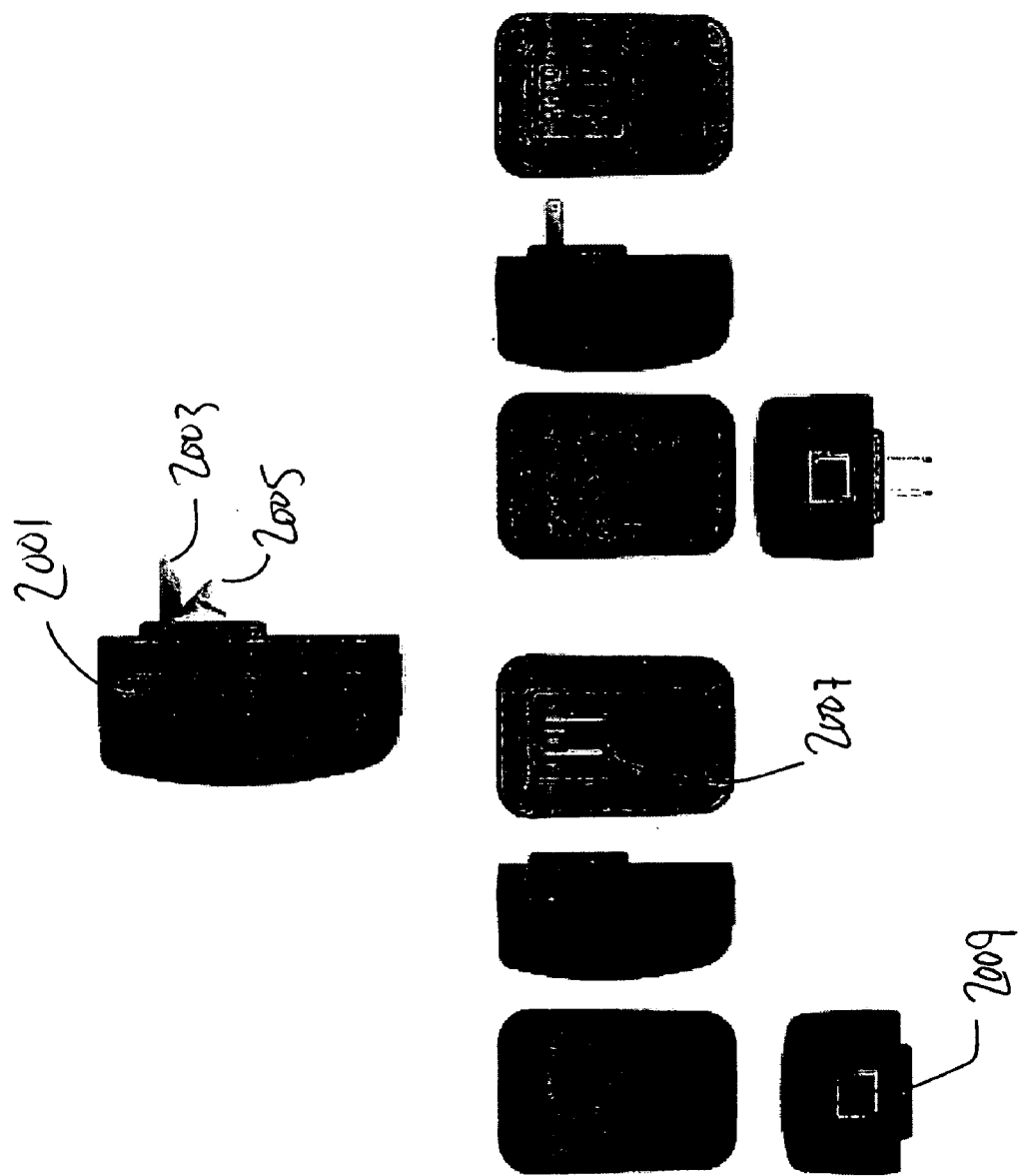
FIG. 20 is a simplified drawing of a housing for a PLC Ethernet Wall Mount and Wireless Access apparatus that illustrates a foldable plugs according to an embodiment of the present invention.

FIG. 20 is a simplified drawing of an apparatus including a housing for a PLC Ethernet Wall Mount and Wireless Access point that illustrates a foldable plugs according to an embodiment of the present invention. This diagram is merely an example, which should not unduly limit the scope of the claims herein. One of ordinary skill in the art would recognize many variations, modifications, and alternatives. As shown, the apparatus has a removable network jack structure including an outlet 2009 for data communications. The apparatus has a housing coupled to the network jack structure. A DC power supply is coupled to and within the housing. A network device including a first port and a second port is coupled to and within the housing. Preferably, the network device is coupled to the DC power supply. A powerline device including a first powerline port and a second powerline port is coupled to and within the housing. The powerline device is coupled to the DC power supply. The first powerline port is coupled to the second port of the network device. Additionally, a coupler is coupled to the second powerline port and is coupled to the outlet for data communications. Preferably, the coupler is coupled to and within the housing. An AC connector 2003 is coupled to the housing and is coupled to the DC power supply. The AC connector is coupled to the first port of the network device. Preferably, the AC connector is operably coupled to the housing through a pivoting device. The AC connector is adapted to protrude 2003 from the housing to be insertable into an AC wall outlet in a first position and the AC connector is adapted to fold 2005 toward the housing about the pivoting device in a second position, as shown. The second position 2007 maintains the connector in the second position, which is within the housing structure, as also shown. Of course, there can be other variations, modifications, and alternatives.

Figure 21:
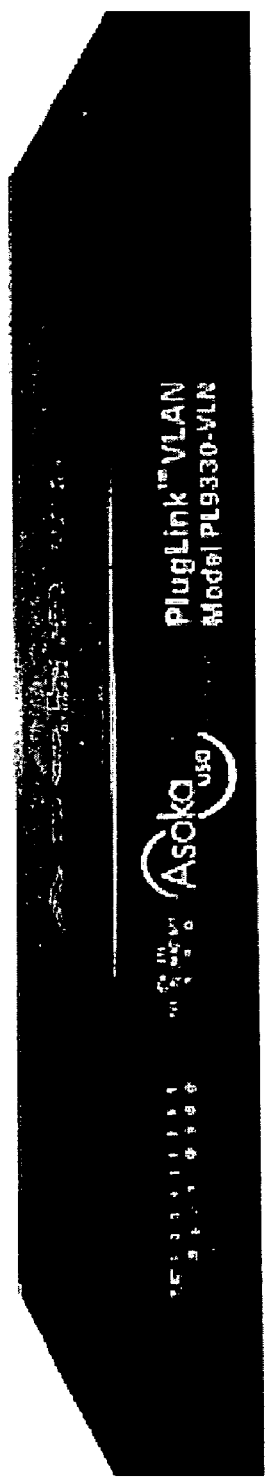
FIG. 21 is a simplified diagram of a PLC VLAN apparatus according to an embodiment of the present invention.

FIG. 21 is a simplified diagram of a PLC VLAN apparatus according to an embodiment of the present invention. This diagram is merely an example, which should not unduly limit the scope of the claims herein. One of ordinary skill in the art would recognize many variations, modifications, and alternatives. As shown, the apparatus includes a housing that includes the various elements described herein, and possibly others.

Figure 22:
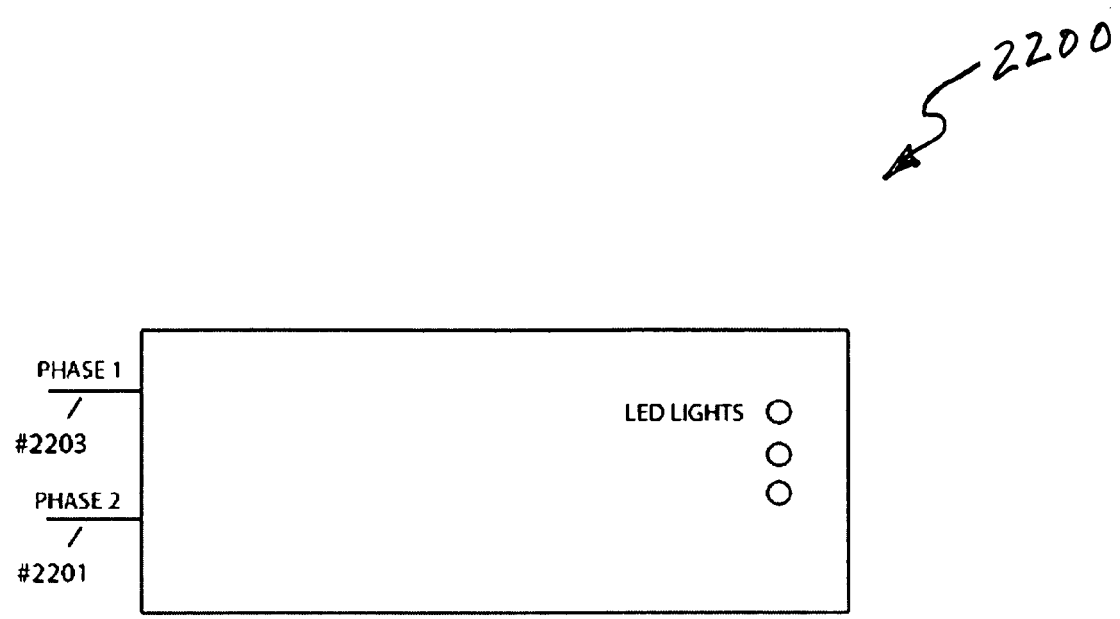
FIG. 22 is a simplified diagram of a PLC Repeater according to an embodiment of the present invention.

FIG. 22 is a simplified diagram of a PLC Repeater according to an embodiment of the present invention. This diagram is merely an example, which should not unduly limit the scope of the claims herein. One of ordinary skill in the art would recognize many variations, modifications, and alternatives. As shown, the apparatus includes a housing 2200 that includes the various elements described herein, and possibly others. The repeater also includes first input/output connection 2203 and second input/output connection 2201, which separate two network architectures according to a specific embodiment.

Further details of various methods according to embodiments of the present invention are provided throughout the present specification and more particularly below.

According to a specific embodiment, a method for converting a plurality of power lines in at least a building structure into a communication network for a plurality of users can be outlined as follows:

1. Coupling an apparatus for communicating between a data source and at least one of a plurality of users through a power line network;
2. Allowing at least one of the users to communicate to the data source through one of the plurality of power lines;
3. Denying access to at least one of the users from communicating to the data source through one of the plurality of power lines.

As shown, the present invention provides an easy way of converting a pre-existing building structure including a plurality of powerlines into a virtual powerline network. The method can be implemented using an apparatus such as the one noted above, but can also vary, depending upon the embodiment. These and other details of the present method can be found throughout the present specification and more particularly below.

Figure 23:
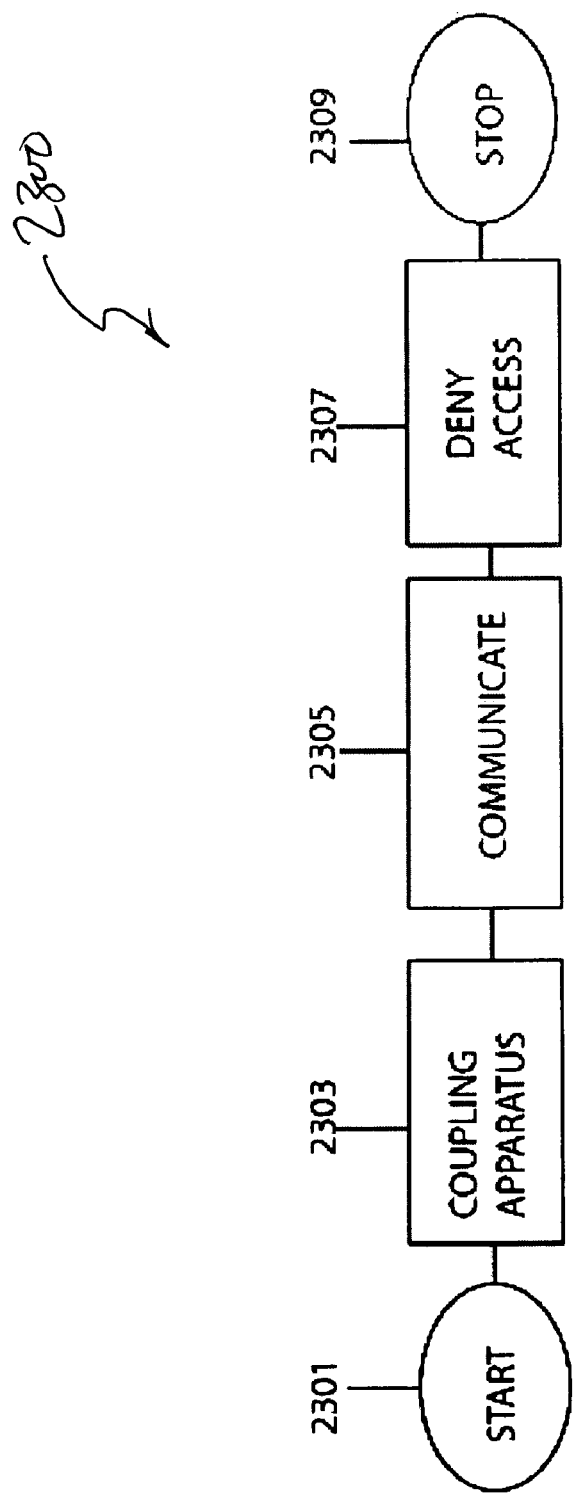
FIGS. 23 and 24 are simplified flow diagrams illustrating methods according to embodiments of the present invention.
Figure 24:
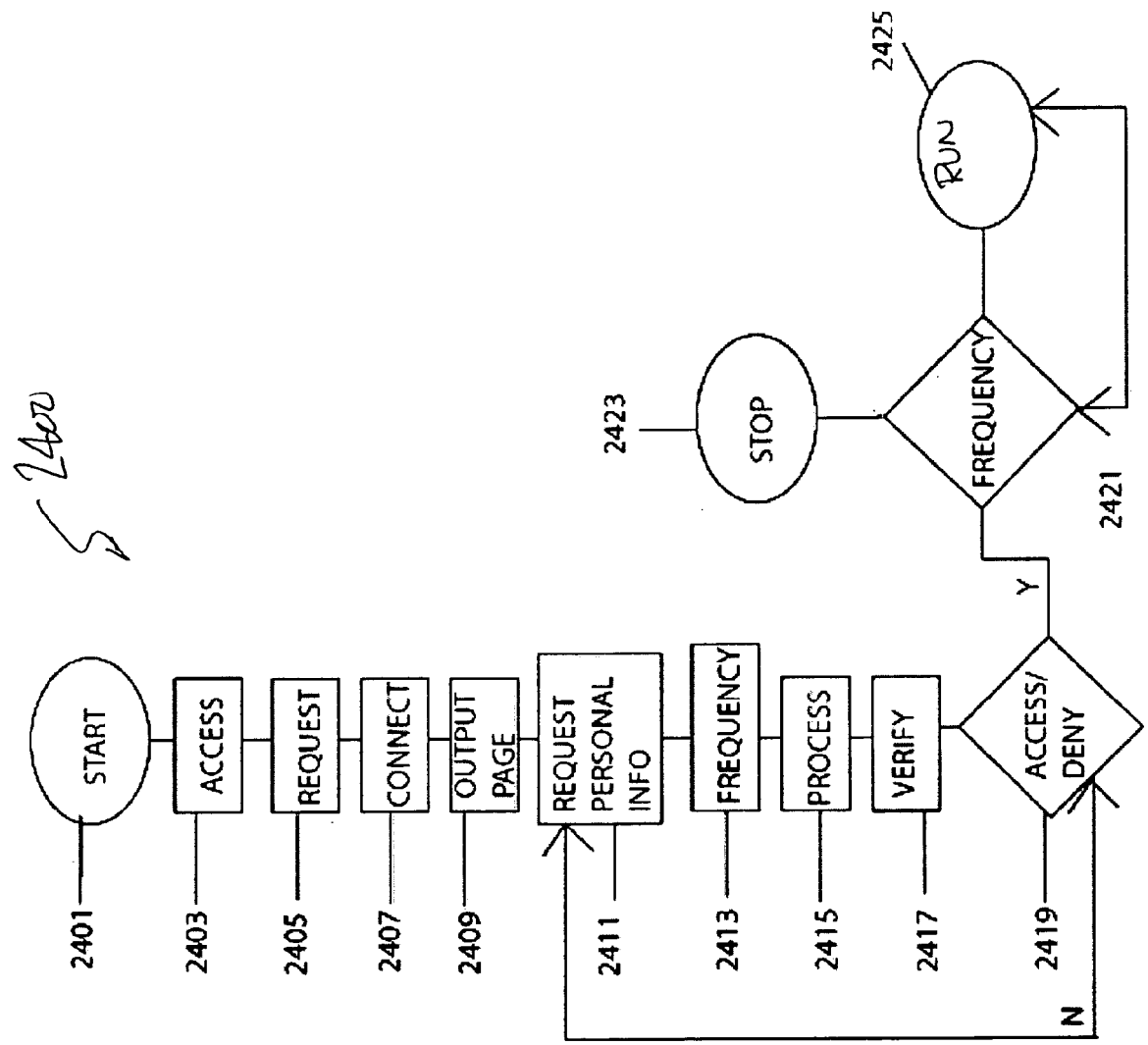
Figure 5:
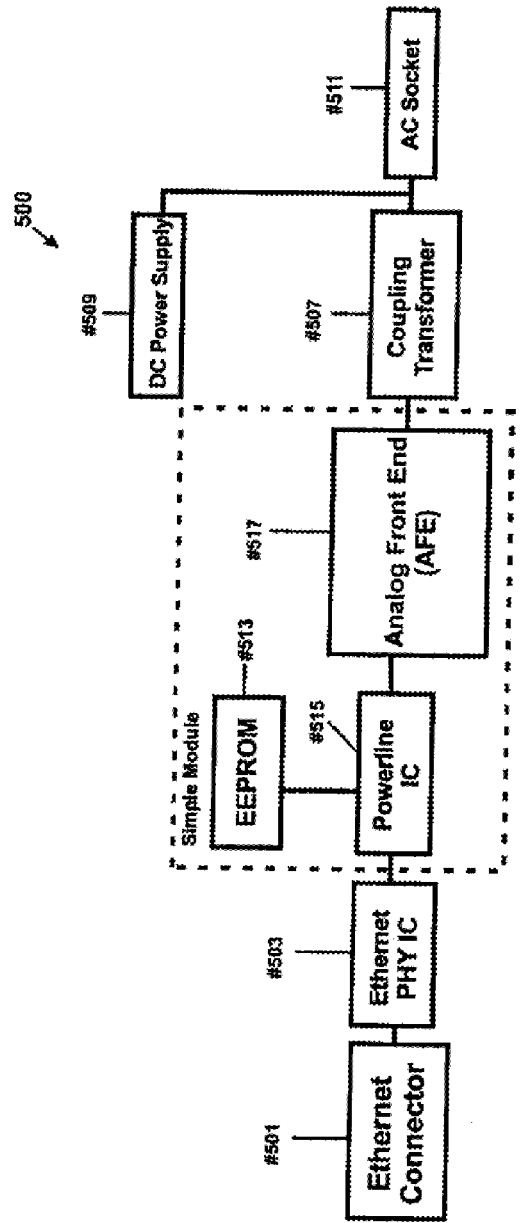

FIGS. 23 and 24 are simplified flow diagrams illustrating methods according to embodiments of the present invention. These diagrams are merely examples, which should not unduly limit the scope of the claims herein. One of ordinary skill in the art would recognize many variations, alternatives, and modifications. As shown, the methods include the method 2300 for converting a plurality of power lines in at least a building structure into a communication network for a plurality of users. The method includes coupling (step 2303) an apparatus for communicating between a data source and at least one of a plurality of users through a power line network. Preferably, coupling occurs by physically connecting input/outputs of the power line apparatus to the powerline wires, which already exist in the building structure. The method includes allowing (step 2305) at least one of the users to communicate to the data source through one of the plurality of power lines. Here, the present powerline apparatus and method can be used. Depending upon the embodiment, the method may include denying (step 2307) access to at least one of the users from communicating to the data source through one of the plurality of power lines. Here, access is denied for a variety of reasons, e.g., time out, incorrect user. Depending upon the embodiment, there can be other variations, modifications, and alternatives.

In an alternative specific embodiment, the invention provides for a billing and collection management method as illustrated by FIG. 24. Preferably, the method can be implemented using the present system or other like systems. A method 2400 according to an embodiment of the present invention can be outlined as follows:

1. Access (step 2403) a web page available on a local server;
2. Request (step 2405) Internet access;
3. Connect (step 2407) to local server;
4. Output (step 2409) page for activating the Internet connection;
5. Request (step 2411) for personal information and credit card number;
6. Enter personal information and credit card number;
7. Enter (step 2413) desired frequency and rate, e.g., hour, day, month;
8. Transmit to server;
9. Process (step 2415) information;
10. Verify (step 2417) information;
11. Allow or deny (step 2419) access based upon the information and frequency and rate;
12. Check (step 2421) frequency and rate and stop (step 2434) or continue to run (step 2425);
13. Return to step 11; and
14. Perform other steps, as desired.

These sequences of steps provides a way of performing a method according to an embodiment of the present invention. As can be seen, the method provides a technique for allowing or denying access to the Internet or other data source using a subscription technique. Further details of the present method can be found throughout the present specification and more particularly below.

According to a specific embodiment, the present method includes application to a multiple tenant environment, such as a hotel, apartment complex, office building, and other entities. Using the hotel example, the MAC address of the room internet connection is generally fixed, so the hotel guest database (if any) can be connected to the Internet access database. The only necessary action to connect to the internet is to click a button allowing charges to be made to the room bill, which could be paid later. The local server at the hotel could also provide information about local restaurants, events, attractions etc., which would often not require an internet account to access and could be financed by advertising. Here, the user would have selected access based upon the present method. Once the user desired to access paid services and upon successful credit card payment or authorization the following would occur:

a) the credit card information is stored in the database, together with a usage time;
b) the remote device control enables the connection to the Internet.

Here, the local server sends out a request for credit card confirmation over a suitable channel. When the confirmation of credit card payment arrives, the local server sends the connection request to the power line network of the present invention. The internet connection is enabled by a number of different mechanisms depending on the network such as: (1) sending a request to the VLAN switch to enable packet forwarding on the port the user is connected to; or (2) controlling access from the router by MAC address filtering. The local server has access to the network control software for enabling/disabling a connection. The process can be either automatically accessed when a access request has been successfully completed by providing payment information. It can also be accessed by a network administrator either locally or remotely using a secure connection. When the purchased usage time expires, the method can, depending on account type:

a) automatically charge the account for another cycle;
b) notify user that connection time expired and request authorization to charge card again.

According to a specific embodiment, a billing and collection system includes a web based user interface for requesting internet connection, database tracking connection status and billing, and remote device management for automatic service.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for converting a plurality of powerlines in at least a building structure into a communication network for a plurality of users, the method comprising:
    coupling an apparatus for communicating between a data source and at least one of a plurality of users through a powerline network, the apparatus comprising:
        a datasource connection, the datasource connection coupled to a data source;
        a powerline device coupled to the datasource, the powerline device being adapted to receive and transmit information in a first format from the datasource and adapted to receive and transmit information in a second format;
        a virtual local area network device including a first input/output port and a plurality of second input/output ports, each of the second input/output ports numbered from 1 through N, where N is an integer greater than 1;
        a plurality of modem devices coupled to the virtual local area network device, the plurality of modem devices numbered from 1 through N, each of the plurality of modem devices being coupled respectively to one of the plurality of second input/output ports, each of the plurality of modem devices also being coupled to one of a plurality of powerlines numbered from 1 through N, each of the powerlines being capable of communicating information to and from the data source;
    allowing at least one of the users to communicate to the data source through one of the plurality of powerlines; and
    denying access to at least one of the users from communicating to the data source through one of the plurality of powerlines;
    wherein the allowing at least one of the users comprises receiving a user code from an unauthorized user coupled to the powerline network; processing the user code; and allowing access to the unauthorized user, the unauthorized user that is allowed to use the powerline network being an authorized user.

2. The method of claim 1 wherein the building structure is an office building.

3. The method of claim 1 wherein the building structure is a residential home.

4. The method of claim 1 wherein the building structure is a multi-tenant building.

5. The method of claim 1 wherein the denying access of at least one of the users comprises receiving a user code from an unauthorized user coupled to the powerline network; processing the user code; and denying access to the unauthorized user, the unauthorized user that is denied to use the-powerline network being maintained as the unauthorized user.

6. Apparatus for powerline communications comprising:
    a face plate structure including a first side and a second side, the first side including an outlet for data communications and a power outlet for AC power;
    a housing coupled to the backside of the face plate structure;
    a DC power supply coupled to and within the housing;
    a network device including a first port and a second port, the network device being coupled to and within the housing, the network device being coupled to the DC power supply;
    a powerline device including a first powerline port and a second powerline port, the powerline device being coupled to and within the housing, the powerline device being coupled to the DC power supply, the first powerline port being coupled to the second port of the network device;
    a coupler coupled to the second powerline port and coupled to the outlet for data communications, the coupler being coupled to and within the housing; and
    an AC connector coupled to the housing and coupled to the DC power supply, the AC connector being coupled to the first port of the network device.

7. Apparatus of claim 6 wherein the face plate structure and housing have a thickness of less than four inches and a width of less than three inches and a height of less than five inches.

8. Apparatus of claim 6 wherein the second port couples to an MII bus, the MII bus interfaces between the second port and the first powerline port.

9. Apparatus of claim 6 wherein the housing is made of a plastic material.

10. Apparatus of claim 6 wherein the housing is removable.

11. Apparatus of claim 6 further comprising an analog front end module coupled to the coupler, the analog front end module being disposed between the coupler and the powerline device.

12. Apparatus of claim 6 wherein the outlet is a CAT 5 connector device.

13. Apparatus for powerline communications comprising:
    a removable network jack structure including an outlet for data communications;
    a housing coupled to the network jack structure;
    a DC power supply coupled to and within the housing;
    a network device including a first port and a second port, the network device being coupled to and within the housing, the network device being coupled to the DC power supply;
    a powerline device including a first powerline port and a second powerline port, the powerline device being coupled to and within the housing, the powerline device being coupled to the DC power supply, the first powerline port being coupled to the second port of the network device;

a coupler coupled to the second powerline port and coupled to the outlet for data communications, the coupler being coupled to and within the housing; and an AC connector coupled to the housing and coupled to the DC power supply, the AC connector being coupled to the first port of the network device.

14. The apparatus of claim 13 wherein the AC connector is operably coupled to the housing through a pivoting device, the AC connector being adapted to protrude from the housing to be insertable into an AC wall outlet in a first position and the AC connector being adapted to fold toward the housing about the pivoting device in a second position.

15. Apparatus of claim 13 wherein the AC connector is maintained within a region of the housing in the second position.

16. A method for converting a plurality of powerlines in at least a building structure into a communication network for a plurality of users, the method comprising:

coupling an apparatus for communicating between a data source and at least one of a plurality of users through a powerline network, the apparatus comprising:

a datasource connection, the datasource connection coupled to a data source;

a powerline device coupled to the datasource, the powerline device being adapted to receive and transmit information in a first format from the datasource and adapted to receive and transmit information in a second format;

a virtual local area network device including a first input/output port and a plurality of second input/output ports, each of the second input/output ports numbered from 1 through N, where N is an integer greater than 1;

a plurality of modem devices coupled to the virtual local area network device, the plurality of modem devices numbered from 1 through N, each of the plurality of modem devices being coupled respectively to one of the plurality of second input/output ports, each of the plurality of modem devices also being coupled to one of a plurality of powerlines numbered from 1 through N, each of the powerlines being capable of communicating information to and from the data source;

allowing at least one of the users to communicate to the data source through one of the plurality of powerlines;

denying access to at least one of the users from communicating to the data source through one of the plurality of powerlines; and wherein the denying access of at least one of the users comprises receiving a user code from an unauthorized user coupled to the powerline network; processing the user code; and denying access to the unauthorized user, the unauthorized user that is denied to use the powerline network being maintained as the unauthorized user.

17. The method of claim 16 wherein the building structure is an office building.

18. The method of claim 16 wherein the building structure is a residential home.

19. The method of claim 16 wherein the building structure is a multi-tenant building.

* * * * *

UNITED STATES PATENT AND TRADEMARK OFFICE
CERTIFICATE OF CORRECTION

PATENT NO. : 7,136,936 B2
APPLICATION NO. : 10/712748
DATED : November 14, 2006
INVENTOR(S) : Tat Keung Chan et al.

It is certified that error appears in the above-identified patent and that said Letters Patent is hereby corrected as shown below:

In the Drawings:

Replace Figure 5, sheet 5 with the attached sheet of the formal drawings.

Signed and Sealed this

Fourth Day of March, 2008

JON W. DUDAS
*Director of the United States Patent and Trademark Office*